(12) United States Patent
Gandhi et al.

(10) Patent No.: US 11,263,654 B2
(45) Date of Patent: Mar. 1, 2022

(54) METHOD AND SYSTEM FOR FACILITATING SHARING OF REWARD POINTS

(71) Applicant: MASTERCARD INTERNATIONAL INCORPORATED, Purchase, NY (US)

(72) Inventors: Puneet Gandhi, Pune (IN); Navneet Jain, Pune (IN); Piyush Sharma, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 84 days.

(21) Appl. No.: 16/435,557

(22) Filed: Jun. 10, 2019

(65) Prior Publication Data
US 2020/0027114 A1 Jan. 23, 2020

(30) Foreign Application Priority Data
Jul. 19, 2018 (SG) .......................... 10201806203V

(51) Int. Cl.
G06Q 30/02 (2012.01)
G06Q 20/38 (2012.01)
G06Q 50/00 (2012.01)

(52) U.S. Cl.
CPC ....... *G06Q 30/0233* (2013.01); *G06Q 20/381* (2013.01); *G06Q 20/387* (2013.01); *G06Q 50/01* (2013.01)

(58) Field of Classification Search
CPC combination set(s) only.
See application file for complete search history.

(56) References Cited

U.S. PATENT DOCUMENTS

| 7,624,041 | B2* | 11/2009 | Postrel ................ G06Q 20/06 |
| | | | 705/14.27 |
| 9,934,537 | B2* | 4/2018 | Berland ............ G06Q 30/0236 |
| 10,157,398 | B2* | 12/2018 | Tiku .................... G06Q 20/384 |
| 10,163,171 | B1* | 12/2018 | Vippagunta ........... G06Q 20/10 |
| 2001/0054006 | A1* | 12/2001 | Lee ....................... G06Q 40/04 |
| | | | 705/26.1 |
| 2003/0200144 | A1* | 10/2003 | Antonucci ........ G06Q 30/0601 |
| | | | 705/14.28 |

(Continued)

FOREIGN PATENT DOCUMENTS

WO    WO-2017209692 A1 * 12/2017 ......... G06Q 30/0207

OTHER PUBLICATIONS

Method and System for Automated Trading of Service Units within Social Networks. May 26, 2011, IP.com, pp. 1-3. (Year: 2011).*

*Primary Examiner* — Marie P Brady

(57) ABSTRACT

Methods and server systems for facilitating sharing of reward points between users are disclosed. Information related to linked one or more social IDs of a first user to a payment account of the first user is received and stored in a mapping file. A request for reward points redemption is initiated by the second user in response to an offer to redeem a fixed number of reward points posted by the first user on a social media platform. A social ID used by the second user to initiate the request on the social media platform is identified. A transfer of the fixed number of reward points from the first user to the second user is facilitated based on the mapping file and the social ID of the second user.

20 Claims, 11 Drawing Sheets

(56) References Cited

U.S. PATENT DOCUMENTS

| | | | | |
|---|---|---|---|---|
| 2011/0004558 A1* | 1/2011 | MacLean | ............... | G06Q 30/02 |
| | | | | 705/80 |
| 2012/0158589 A1* | 6/2012 | Katzin | ................. | G06Q 20/384 |
| | | | | 705/44 |
| 2013/0144785 A1* | 6/2013 | Karpenko | ............ | G06Q 20/425 |
| | | | | 705/44 |
| 2016/0307178 A1* | 10/2016 | Beaulieu | ............ | G06Q 30/0601 |
| 2017/0286990 A1* | 10/2017 | Kikuchi | ................. | G06Q 40/04 |
| 2018/0225696 A1* | 8/2018 | Sun | ........................ | G06Q 50/01 |

\* cited by examiner

METHOD AND SYSTEM FOR FACILITATING SHARING OF REWARD POINTS

CROSS REFERENCE TO RELATED APPLICATION

This application claims priority to Singapore Patent Application No. 10201806203V, filed Jul. 19, 2018, entitled "Method and System for Facilitating Sharing of Reward Points", the entirety of which is incorporated herein by reference.

TECHNICAL FIELD

The present disclosure generally relates to reward points earned by users on consumption of enterprise offerings and, more particularly to, a method and system for facilitating sharing of reward points by users.

BACKGROUND

Most enterprises, nowadays, offer a reward points program to the users of their respective products or services to encourage the users to continue purchasing their products/services and also spend more per purchase. Each purchase transaction by a user earns the user a fixed number of reward points depending on the category of the product or service purchased, on an amount of the transaction, on a type of payment card, and the like. Generally, the enterprise may set milestones on accrual of reward points and the user after reaching a milestone may redeem the reward points towards eligible awards, such as purchase of certain products or services.

In most reward points programs, the reward points expire if not used within a certain period of time. In such cases, the user is forced to redeem the reward points towards purchasing items or availing services that the user may otherwise have not intended to purchase or avail. If the user does not initiate redemption of the reward points that are about to expire, the reward points lapse, thereby ruining an experience of reward points program for the user and also defeating the purpose of encouraging the user to make more purchase transactions. Currently, there is no mechanism to utilize the reward points that are about to expire except for redeeming them towards purchases.

In some example scenarios, a user may wish to purchase a product or service using the reward points, but, may fall short of the reward points milestone allowing the purchase. Currently, there is no mechanism to enable the users to acquire reward points without earning the reward points through purchase of enterprise products or services.

SUMMARY

Various embodiments of the present disclosure provide methods and systems for facilitating sharing of reward points between users.

In an embodiment, a method for facilitating sharing of reward points is disclosed. The method includes receiving, by a server system associated with a payment network, information related to a first user. The information includes one or more social IDs of the first user linked to a payment account associated with the first user. The information is received from an issuer associated with the payment account. The method includes storing, by the server system, a mapping of the one or more social IDs of the first user with the payment account associated with the first user in a mapping file. The method includes receiving, by the server system, a request for reward points redemption from the issuer. The request for the reward points redemption is initiated by a second user and approved by the first user. The request is initiated by the second user in response to an offer to redeem a fixed number of reward points posted by the first user on a social media platform. The method includes identifying, by the server system, a social ID used by the second user to initiate the request for the reward points redemption on the social media platform. The method includes facilitating, by the server system, transfer of the fixed number of reward points from the first user to the second user in response to the receipt of the request. The transfer of the fixed number of reward points is facilitated based on the mapping file and the social ID of the second user.

In another embodiment, a server system configured to facilitate sharing of reward points is disclosed. The server system includes a memory comprising stored instructions and a processor communicably coupled to memory. The processor is configured to execute the stored instructions to cause the server system to receive information related to a first user. The information includes one or more social IDs of the first user linked to a payment account associated with the first user. The information is received from an issuer associated with the payment account. The server system is caused to store a mapping of the one or more social IDs of the first user with the payment account associated with the first user in a mapping file. The server system is caused to receive a request for reward points redemption from the issuer. The request for the reward points redemption is initiated by a second user and approved by the first user. The request is initiated by the second user in response to an offer to redeem a fixed number of reward points posted by the first user on a social media platform. The server system is caused to identify a social ID used by the second user to initiate the request for the reward points redemption on the social media platform. The server system is caused to facilitate transfer of the fixed number of reward points from the first user to the second user in response to the receipt of the request. The transfer of the fixed number of reward points is facilitated based on the mapping file and the social ID of the second user.

In an embodiment, another method for facilitating sharing of reward points is disclosed. The method includes provisioning, by a payment server, an online interface to facilitate linking of one or more social IDs of a first user to a payment account of the first user. The method includes facilitating, by the payment server, an authentication of an identity of the first user for each social ID linked to the payment account of the first user. The method includes storing, by the payment server, a mapping of the one or more social IDs of the first user with the payment account associated with the first user in a mapping file. The method includes receiving, by the payment server, a request for reward points redemption. The request for the reward points redemption is initiated by a second user and approved by the first user. The request is initiated by the second user in response to an offer to redeem a fixed number of reward points posted by the first user on a social media platform. The method includes identifying, by the payment server, a social ID used by the second user to initiate the request for the reward points redemption on the social media platform. The method includes computing, by the payment server, a price of redeeming the fixed number of reward points. The price is notified to the second user on a contact identifier of the second user associated with the social ID of the second user. The method includes facilitating, by the payment server, transfer of the fixed number of reward points from the first user to the second user subsequent to a debiting of an amount equivalent to the price of redeeming the fixed number of reward points from a payment account of the second user. The transfer of the fixed number of reward points is facilitated based on the mapping file and the social ID of the second user.

BRIEF DESCRIPTION OF THE FIGURES

For a more complete understanding of example embodiments of the present technology, reference is now made to the following descriptions taken in connection with the accompanying drawings in which.

Figure 1:
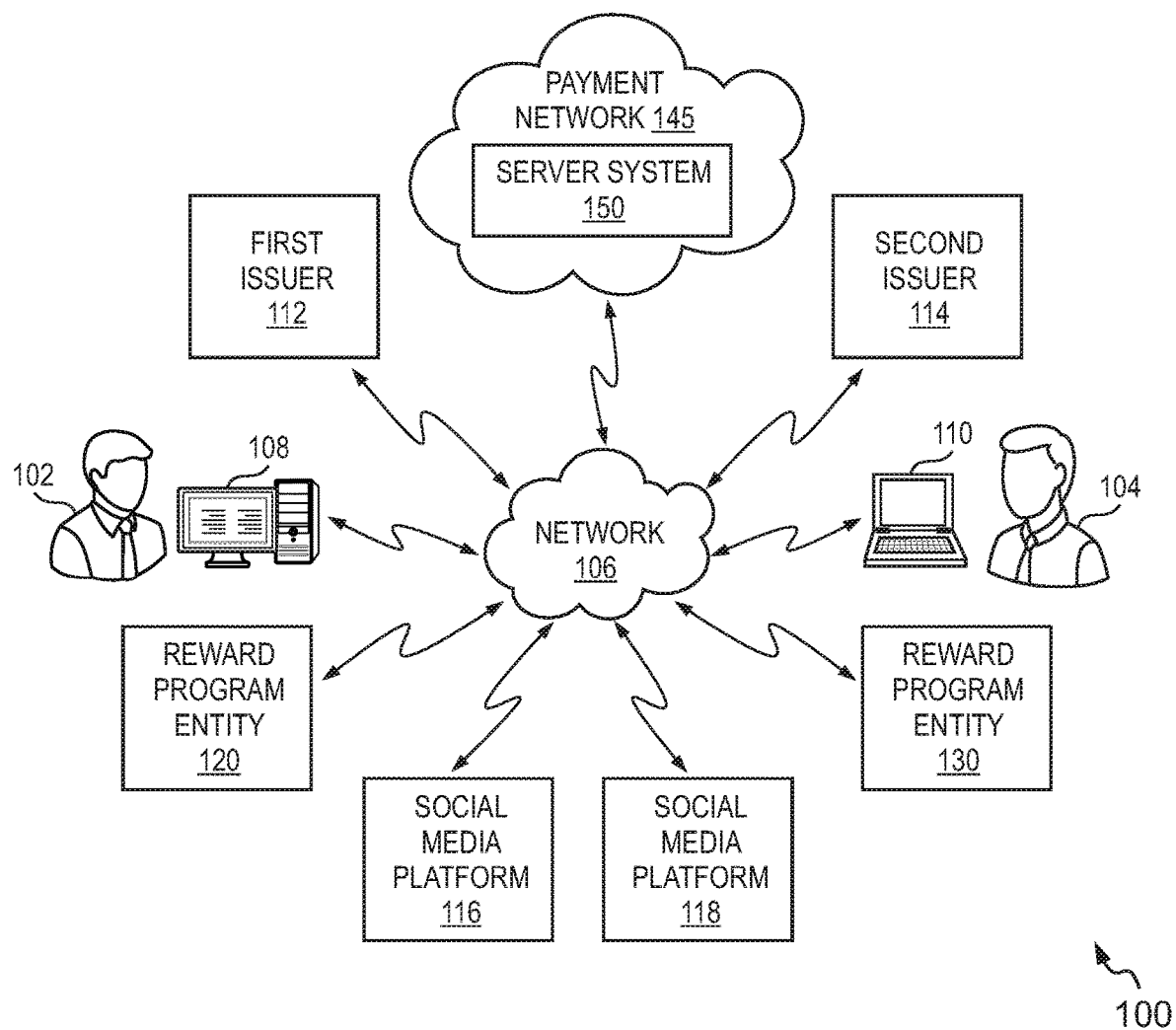
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction"). Examples of the payment account include, but is not limited to a savings account, a credit account, a checking account and a virtual payment account. The payment account may be associated with an entity such as an individual person, a family, a commercial entity, a company, a corporation, a governmental entity, a non-profit organization, and the like. In some scenarios, a payment account may be a virtual or temporary payment account that can be mapped or linked to a primary payment account, such as those accounts managed by PayPal®, and the like.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

Overview

Currently, there is no mechanism to enable users to utilize the reward points that are nearing expiry except for redeeming them towards purchases. On the other hand, the users who wish to acquire reward points to meet reward point milestones are not able to acquire the reward points without earning the reward points through purchase of enterprise products or services.

Various example embodiments of the present disclosure provide a method and a system that are capable of overcoming the above drawbacks and providing additional advantages. More specifically, various embodiments as disclosed herein facilitate sharing of reward points between users. The reward points are shared using the user's respective social media IDs (also referred to herein as social IDs). The term 'social ID' as used herein may refer to a username, a user tag, an account ID, a hashtag (#) credential, and the like, as used by a user in relation to a respective social media platform. As most users, nowadays, are frequent users of social media platforms, the use of social IDs to share reward points precludes the need to install and learn a separate application for reward points sharing and, moreover, provides a level of comfort and ease of use to the users. A user may post an offer to redeem the reward points that are nearing expiry, and, another user interested in acquiring the reward points may respond to the offer and purchase the reward points from the owner of the reward points. Such sharing of reward points enables the user to utilize the reward points that are nearing expiry without engaging in purchase transactions for redeeming the reward points. On the other hand, a user may acquire the reward points from another user to meet reward points milestones without engaging in purchase transactions aimed towards gaining reward points to meet those milestones. The sharing of reward points between users is explained in detail hereinafter with reference to FIGS. 1 to 13.

FIG. 1 illustrates an example representation of an environment 100, in which at least some example embodiments of the present disclosure can be implemented.

The environment 100 depicts two users, such as a first user 102 and a second user 104 for illustration purposes. The first user 102 and the second user 104 are connected to a communication network, such as a network 106, using their respective electronic devices. For example, the first user 102 is depicted to be associated with an electronic device 108 and the second user 104 is depicted to be associated with an electronic device 110. The electronic devices 108 and 110 are exemplarily depicted to a desktop computer and a laptop, respectively. It is noted that the electronic devices 108 and 110 may be embodied as any device capable of facilitating user communication with remote entities, such as online interfaces of banking institutions, social media platforms, etc., over the network 106. The network 106 may include any type of wired network, wireless network, or a combination of wired and wireless networks. A wired network may be a local area network ("LAN"), an Ethernet network, a fiber-optic network, and the like. A wireless network may be a wireless local area network ("WLAN"), a wireless wide area network ("WWAN"), or any other type of wireless network now known or later developed. Additionally, the network 106 may be or include the Internet, intranets, extranets, microwave networks, satellite communications, cellular systems, personal communication services ("PCS"), infrared communications, global area networks, or other suitable networks, etc., or any combination of two or more such networks.

The first user 102 and the second user 104 may maintain financial accounts, referred to hereinafter as payment accounts, to fund financial transactions. Examples of a payment account include, but is not limited to a savings account, a credit account, a checking account and a virtual payment account. A physical or virtual payment card linked with the payment account may be used to fund a financial transaction to a merchant or any such facility via the associated payment account. Examples of the payment card include, but are not limited to, a debit card, a credit card, a prepaid card, a virtual payment number, a virtual card number, a forex card, a charge card and a stored-value card. The institution associated with maintaining the payment accounts for the users and issuing corresponding payment cards to the users are referred to as 'issuing banks' or simply as 'issuers'. As an illustrative example, the first user 102 may maintain a payment account with a first issuer 112 and the second user 104 may maintain a payment account with a second issuer 114. It is noted that in some embodiments, the first user 102 and the second user 104 may also maintain a payment account with the same issuer, such as the first issuer 112 or the second issuer 114.

Each of the first issuer 112 and the second issuer 114 may provision an online interface for enabling a plurality of users to access their respective payment accounts and perform various banking activities, such as checking balance, transferring funds, making bill payments, and the like. The first user 102 and the second user 104 may access the online interface of the respective issuers over the network 106 using their respective electronic devices.

The first user 102 and the second user 104 may also use their respective electronic devices to access social media platforms, such as a social media platform 116 and a social media platform 118 over the network 106. Some examples of the social media platforms 116 and 118 may include, but are not limited to Facebook®, Twitter®, LinkedIn®, WhatsApp®, Snapchat®, and the like. Each user of the social media platform may create a personal account and thereafter use the personal account to interact with other users of the social media platform. The user credential, such as for example a username, a user tag, an account ID, a hashtag (#) credential, etc., facilitating unique identification of the user on the social media platform is referred to hereinafter as a 'Social media ID' or 'Social ID'. For example, a user 'John Doe' may be associated with a Twitter® social ID '#AVENGERJOHN' and Facebook® social ID of 'JOHN.DOE'. Accordingly, each user may be associated with a social ID corresponding to the user's account on each social media platform. In an illustrative example, the first user 102 may be associated with a first social ID corresponding to the user's account on the social media platform 116 and a second social ID corresponding to the user's account on the social media platform 118.

The first user 102 and the second user 104 may also be participants in various reward points programs offered by a plurality of enterprises. For example, enterprises such as an airline enterprise, a fashion outlet, a retailer, and the like, may offer reward points program to their customers to encourage spending on their respective offerings. The enterprises offering reward points programs are referred to hereinafter as 'reward program entities'. The environment 100 exemplarily depicts two reward program entities in form of a reward program entity 120 and a reward program entity 130 for illustration purposes. In an example scenario, the first user 102 may be a participant of the reward points program offered by the reward program entity 120 and may have accrued a number of reward points by engaging in purchase transactions related to enterprise offerings associated with the reward program entity 120.

The environment 100 further depicts a server system 150 associated with a payment network 145. The term "payment network" refers to a network or collection of systems used for transfer of funds through use of cash-substitutes. Payment networks may use a variety of different protocols and procedures in order to process the transfer of money for various types of transactions. Transactions that may be performed via the payment network 145 may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

In one embodiment, the server system 150 is embodied as a payment server of the payment network 145. The payment network 145 may be used by payment cards issuing authorities as a payment interchange network. Examples of payment interchange network include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

The server system 150 is configured to facilitate sharing of reward points between users, such as the first user 102 and the second user 104. In at least one example embodiment, a plurality of reward program entities may have registered with the server system 150 to extend service related to sharing of reward points to their users. The server system 150 is also configured to be in operative communication with a plurality of issuers, such as the first issuer 112 and the second issuer 114, as well as a plurality of social media platforms, such as the social media platform 116 and the social media platform 118, to facilitate sharing of reward points, as will be explained in detail hereinafter.

In at least one example embodiment, an issuer is configured to provision an online interface to facilitate linking of social IDs of the users to the respective user payment accounts. In an illustrative example, the first user 102 may access the online interface provisioned by the first issuer 112 over the network 106 using the electronic device 108. The online interface, upon access, may be configured to display a user interface (UI) capable of facilitating linking of one or more social IDs of the first user 102 with a payment account of the first user 102 maintained at the first issuer 112. The first user 102 may provide an input related to the social IDs of the first user 102 and request linking of the social IDs with the payment account. The first issuer 112 may be in operative communication with the social media platforms, such as the social media platforms 116 and 118, over the network 106. In response to the user request related to linking of the social IDs, the first issuer 112 may be caused to authenticate the first user 102 for each social ID provided by the first user 102 for linking with the payment account. In an illustrative example, the first user 102 may be a user of social media platform 'Facebook®' and a Facebook ID of the first user 102 may be 'JOHN. DOE'. Accordingly, the first user 102 may provide the social ID 'JOHN.DOE' on the online interface of the first issuer 112 for linking with the payment account. In one embodiment, the user authentication may be performed by both systems, i.e. the first issuer 112 and the social media platform (i.e. Facebook®, in this case), using standard authentication mechanisms, such as password, one-time password (OTP), and the like. Subsequent to the successful authentication of the first user 102 by both systems, the social ID of the first user 102 may be linked with the payment account of the first user 102. In some embodiments, the linked social ID may be activated after a predefined time period, such as for example, after a two-day period has lapsed. After successful linking of the social ID to the payment account and its subsequent activation, the social ID of the first user 102 may be used to validate the user during financial transactions from the payment account of the first user 102. It is noted that the first user 102 may link a plurality of social IDs with the payment account and the authentication of the first user 102 may be performed by both the first issuer 112 and the respective social media platform for each social ID linked to the payment account of the first user 102.

In at least one example embodiment, the first issuer 112 may be configured to provision information related to the first user 102 to the server system 150. The information related to the first user 102 includes one or more social IDs of the first user 102 linked to the payment account associated with the first user 102. In some embodiments, the information related to the first user 102 may also include contact identifiers, such as a phone number, an Email ID, etc. related to the first user 102. The term 'contact identifier' as used herein refers to credentials facilitating contact with the user, such as the user Email ID, the user phone number, and the like.

In at least one example embodiment, the server system 150 is configured to store a mapping of the one or more social IDs of the first user 102 with the payment account associated with the first user 102 in a mapping file. More specifically, the mapping file stores the mapping of the one or more social IDs of the first user 102 to the payment account of the first user 102.

As explained above, the first user 102 may have self-registered with reward points programs offered by various reward program entities. In an example scenario, the reward points of the first user 102 may be nearing expiry. It is understood that reward points offered by most reward point programs are associated with an expiry date, such as two years or one year or any such predefined time period from the reward point earning date. In a scenario where the reward points are nearing expiry, the first user 102 may post an offer to redeem a fixed number of reward points (i.e. the reward points, which are about to expire) on a social media platform, such as the social media platform 116. In one embodiment, the offer to redeem the fixed number of reward points posted by the first user 102 on the social media platform 116 includes an option capable of being selected by an interested user to request redemption of the fixed number of reward points.

In an example scenario, the second user 104 may be interested in redeeming the reward points offered for redemption by the first user 102. Accordingly, the second user 104 may select the option included within the post of the first user 102 on the social media platform 116. In one embodiment, the selection of the option by the second user 104 is configured to invoke a notification to the first user 102. For example, the social media platform 116 may be configured to invoke a notification and provision the notification to the first user 102 to seek approval of the first user 102 in relation to the request for the reward points redemption initiated by the second user 104. The notification may include an option to approve or to deny approval to the rewards point redemption. In one embodiment, the approval of the reward points redemption request by the first user 102 may cause provisioning of an API call to the first issuer 112, which in turn, may be configured to provision the request to the server system 150.

The server system 150 is configured to receive the request for reward points redemption from the first issuer 112. As explained above, the request for the reward points redemption is initiated by the second user 104 and approved by the first user 102. After receiving the request, the server system 150 may be caused to identify a social ID used by the second user 104 to initiate the request for rewards point redemption on the social media platform 116.

In an embodiment, the server system 150 is configured to facilitate transfer of the fixed number of rewards points from the first user 102 to the second user 104 based on the mapping file and the social ID of the second user 104. More specifically, the server system 150 is configured to identify the first user 102 from the mapping file based on the social ID from which the approval of the reward points redemption request is received. Thereafter, a reward point account associated with the first user 102 and the payment account of the first user 102 with the first issuer 112 is identified. Similarly, the second user 104 is identified from the social ID of the second user 104. In an illustrative example, the second user 104 may similarly have linked the social ID to a respective payment account. The payment account of the second user 104 with the second issuer 114 and reward points account associated with the second user 104 may also be identified from a corresponding mapping file stored at the server system 150. Thereafter, a transfer of reward points from a reward points account of the first user 102 to a reward points account of the second user 104 is facilitated by the server system 150. It is noted that the term 'reward points account' as used herein may refer to a separate account configured to maintain reward points related information and linked with the payment account of a user, or, may refer to reward points related information stored within the payment account of the user itself.

In at least one example embodiment, the server system 150 may further be configured to compute a price of redeeming the fixed number of reward points based, at least in part, on a predefined cost per reward point. For example, if the predefined cost per reward point is one US Dollar, then the price for redeeming hundred reward points is computed as 100 US Dollars by the server system 150.

In some embodiments, the reward points offered for redemption may be associated with a currency (for example, a first currency) different than a currency (for example, a second currency) in which the second user 104 may make a payment to redeem the reward points. In such a scenario, the server system 150 is configured to determine a prevailing currency exchange rate between the first currency and the second currency, and correct the price based on the prevailing currency exchange rate. For example, the fixed number of reward points offered for redemption may be associated with US Dollar currency, i.e. the reward points were accrued based on financial transactions executed in US Dollar currency. If the second user 104 wishes to purchase the reward points using a payment account associated with Indian Rupee, then the server system 150 may be configured to determine a prevailing currency exchange rate, for example, 1 US Dollar=65 Indian Rupees, and thereafter correct the 100 US Dollar price for redeeming hundred reward points to 6500 Indian Rupees by using the prevailing currency exchange rate of 65, between the US Dollar and the Indian Rupee. It is noted the conversion of the price from the US Dollar currency to the Indian Rupee is mentioned herein for illustration purposes and may not be limited to the example provided herein.

The server system 150 is further configured to notify the price to the second user 104. It is noted that the price is notified to the second user 104 on a contact identifier of the second user 104 associated with the social ID of the second user 104. In response to the approval of the price by the second user 104, the server system 150 is configured to facilitate debiting of an amount equivalent to the price of redeeming the fixed number of reward points from the payment account of the second user 104. Furthermore, in at least one example embodiment, the server system 150 is configured to facilitate crediting the payment account of the first user 102 with the amount debited from the payment account of the second user 104. An example processing of the financial transaction is further explained in detail below.

As explained, the server system 150 may be associated with the payment network 145. Using the payment network 145, the computers of the first issuer 112 communicate with the computers of the second issuer 114 to determine whether the second user's payment account is in good standing and whether the purchase of the reward points is covered by the second user's available account balance. Based on these determinations, authorization of the payment transaction is declined or accepted. When the authorization is accepted, the available balance of the second user's payment account is decreased. Normally, a charge is not posted immediately to the second user's account because bankcard associations, such as Mastercard International Incorporated®, have promulgated rules that do not allow a merchant to charge, or "capture," a transaction until goods are shipped or services are delivered. When the reward points are transferred, the first issuer 112 captures the transaction by, for example, appropriate data entry procedures. If the second user 104 cancels a transaction before it is captured, a "void" is generated.

After a transaction is captured, the transaction is settled between the second issuer 114 and the first issuer 112. Settlement refers to the transfer of financial data or funds between the merchant's account, the acquirer, and the issuer, related to the transaction. Usually, transactions are captured and accumulated into a "batch", which is settled as a group.

In some embodiments, the first user 102 may choose to receive reward points instead of the amount debited from the payment account of the second user 104. In such a case, the server system 150 may be configured to convert the amount into equivalent number of reward points based on the predefined cost per reward point and credit the payment account (or more specifically, the reward points account) of the first user 102 with the reward points.

In one embodiment, subsequent to successful crediting of funds or reward points to the payment account of the first user 102, the fixed number of reward points are transferred from a first rewards point account associated with the first user 102 to a second rewards point account associated with the second user 104.

Accordingly, the server system 150 enables the first user 102 to redeem the reward points that are nearing expiry without engaging in purchase transactions for redeeming the rewards points. Further, the second user 104 is also able to acquire the reward points from the first user 102 to meet reward points milestones without engaging in purchase transactions aimed towards gaining reward points to meet those milestones. Thus, the sharing of reward points is mutually beneficial to the both the first user 102 and the second user 104 and moreover, the sharing is facilitated by the server system 150 using social media, which the users are fairly familiar with, thereby adding to the convenience in sharing of reward points. A sequence flow diagram illustrating linking of a social ID to a payment account of the first user 102 is explained with reference to FIG. 2.

Figure 2:
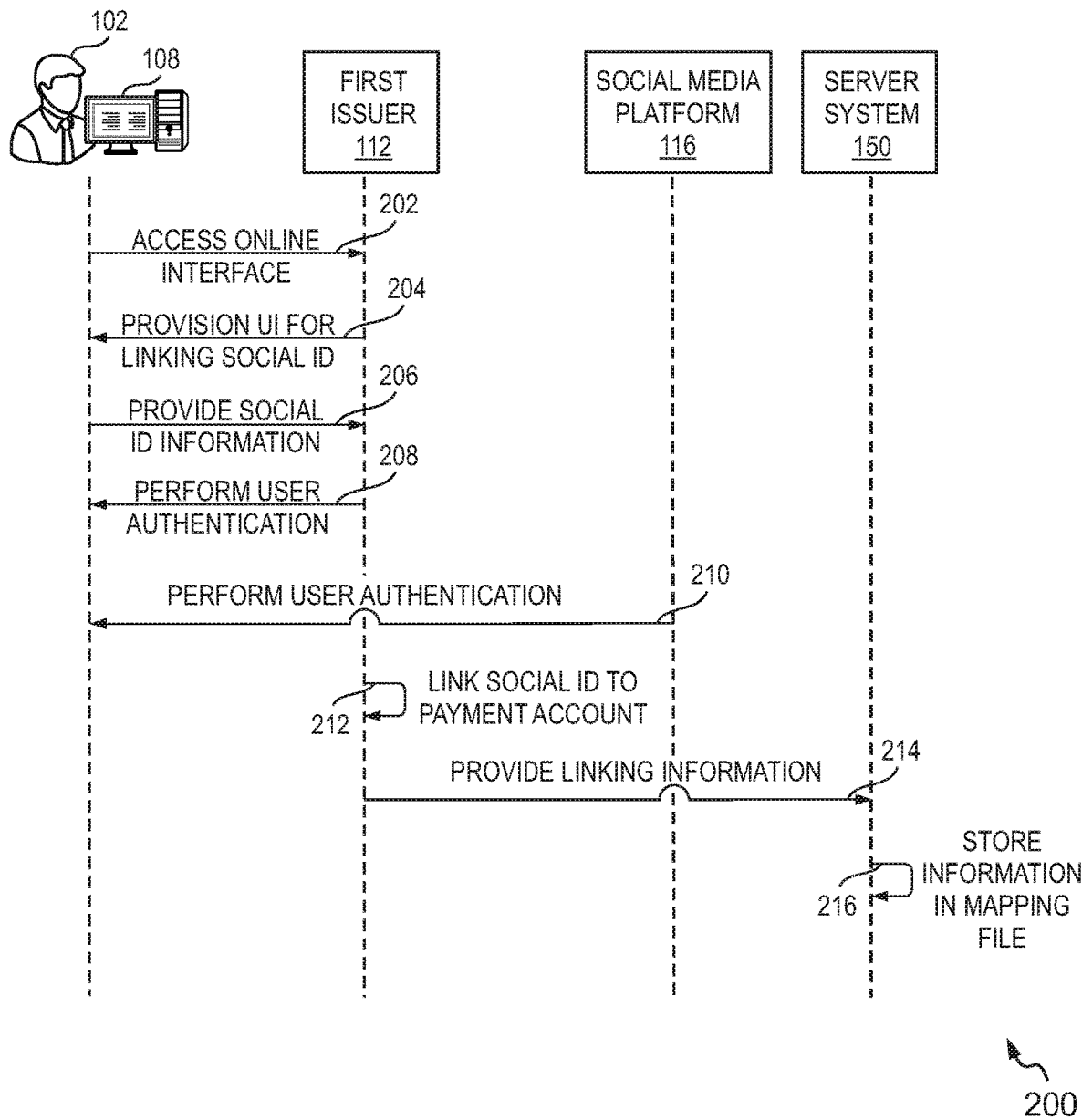
FIG. 2 represents a sequence flow diagram for illustrating a linking of a social ID of the first user with a payment account of the first user, in accordance with an example embodiment of the present disclosure.

FIG. 2 represents a sequence flow diagram 200 for illustrating a linking of a social ID of the first user 102 with a payment account of the first user 102, in accordance with an example embodiment of the present disclosure.

As explained with reference to FIG. 1, users may link one or more social IDs to their respective payment accounts. The linked social IDs may then facilitate sharing of reward points across a plurality of reward points programs. Accordingly, FIG. 2 illustrates linking of one social ID of the first user 102 to a payment account of the first user 102 maintained at the first issuer 112. The sequence flow 200 diagram starts at 202.

At 202, the first user 102 using the electronic device 108 accesses an online interface associated with the first issuer 112.

At 204, the first issuer 112 provisions a UI capable of facilitating a linking of one or more social IDs of the first user 102 with a payment account of the first user 102 maintained at the first issuer 112. An example representation of the UI facilitating linking of the social IDs of the first user 102 with the payment account of the first user 102 is shown in FIG. 4B.

At 206, the first user 102 provides information related to a social ID of the first user 102 on the UI associated with the online interface of the first issuer 112. The social ID may be associated with user credential related to the social media platform 116.

At 208, the first issuer 112 performs authentication of the first user 102 for social ID provisioned by the first user 102.

At 210, the social media platform 116 performs authentication of the first user 102 for the social ID provisioned by the user 102.

Subsequent to the successful authentication of the first user 102 by the first issuer 112 and the social media platform 116, at 212, the social ID of the first user 102 is linked with the payment account of the first user 102 by the first issuer 112.

At 214, the first issuer 112 provisions the information related to the first user 102 to the server system 150. The information includes the social ID of the first user 102 and the payment account information of the first user 102. In some embodiments, the information may also include one or more contact identifiers, such as phone number, Email ID, etc., of the first user 102.

At 216, the server system 150 stores the information related to the linking of the social ID of the first user 102 to the payment account of the first user 102 in a mapping file.

It is noted that the first user 102 may similarly link other social IDs to the payment account. The information related to the other social IDs linked with the payment account may also be stored in the mapping file maintained by the server system 150.

Further, the second user 104 may also similarly access the online interface provisioned by the second issuer 114 (shown in FIG. 1) using the electronic device 110 to link one or more social IDs to the payment account of the second user 104. It is noted that in some embodiments, the first user 102 and the second user 104 may also maintain payment accounts with the same issuer, i.e. the first issuer 112 or the second issuer 114.

Figure 3:
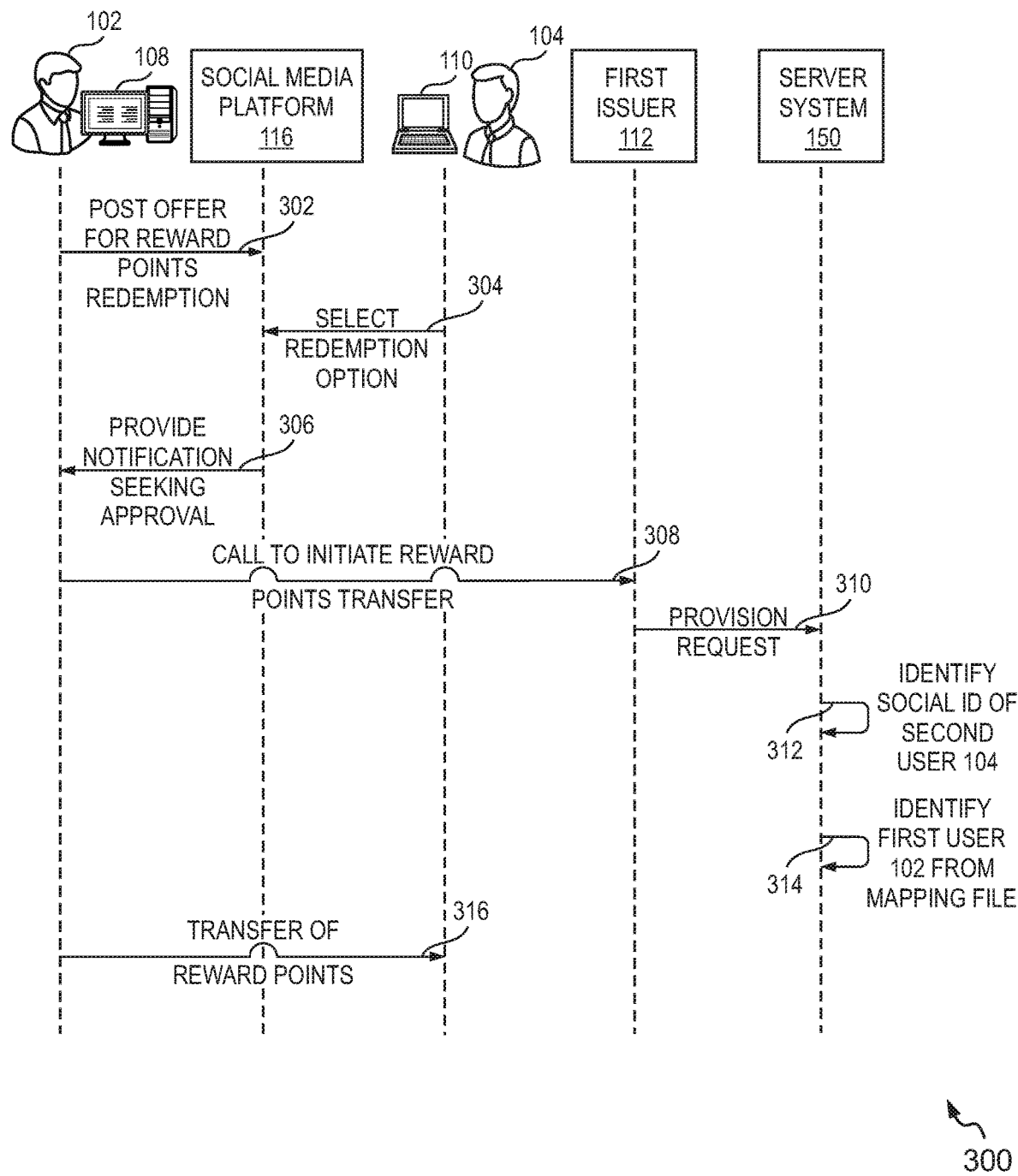
FIG. 3 represents a sequence flow diagram for illustrating a server system facilitating sharing of reward points between the users, in accordance with an example embodiment of the present disclosure.

FIG. 3 represents a sequence flow diagram 300 for illustrating the server system 150 of FIG. 1 facilitating sharing of reward points between the users, in accordance with an example embodiment of the present disclosure. The terms 'server system', or 'server' or 'system' are used interchangeably hereinafter. In at least one example embodiment, the term 'server system 150' as used herein corresponds to a payment server associated with the payment network 145 (shown in FIG. 1). In some embodiments, the server system 150 may correspond to the issuer server, such as a server associated with the first issuer 112 or the second issuer 114 shown in FIG. 1. In some example scenarios, the issuer server and the payment server can be a single entity, or any two of these servers may be a single entity, configuring the server system 150. The sequence flow diagram 300 starts at 302.

At 302, the first user 102 using the electronic device 108 accesses the social media platform 116 and posts a message on the media platform 116. The message corresponds to an offer for redemption of a fixed number of reward points. As explained with reference to FIG. 1, the first user 102 may have some reward points, which are nearing expiry, and accordingly instead of allowing the reward points to lapse or engage in unintentional purchases to redeem the reward points, the first user 102 may choose to offer those reward points for redemption by other users. The offer for redemption of the fixed number of reward points posted on the social media platform 116 may include an option, which when selected may initiate a request for reward points redemption.

At 304, the second user 104 using the electronic device 110 accesses the social media platform 116 and selects the option in the offer to request redemption of the fixed number of reward points of the first user 102.

At 306, the social media platform 116 provisions a notification to the first user 102 to seek an approval of the request for reward points redemption by the second user 104. In an illustrative example, the selection of the option in the message causes the social media platform 116 to invoke an SQL query, which triggers a notification to the first user 102 on a contact identifier associated with the first user 102. In at least some embodiments, the notification may be provisioned as a Short Message Service (SMS).

At 308, the approval of the request by the first user 102 causes invoking of an Application Programming Interface (API) call to the first issuer 112 to initiate the transfer of the fixed number of reward points from the first user 102 to the second user 104.

At 310, the first issuer 112 provisions the request for reward points redemption to the server system 150.

At 312, the server system 150 identifies the social ID of the second user 104 from the request for reward points redemption.

At 314, the server system 150 identifies the first user 102 from the mapping file.

At 316, the server system 150 facilitates transfer of the fixed number of reward points from the first user 102 to the second user 104 in response to the reward points redemption request from the second user 104.

It is noted that in some embodiments, the server system 150 is configured to compute a price of redeeming the fixed number of reward points based on a predefined cost per reward point and thereafter correct the price based on a difference in a first currency associated with the fixed number of reward points and a second currency associated with the payment account of the second user 104. An amount equivalent to the price may be debited from the payment account of the second user 104. The debited amount may be credited to the payment account of the first user 102, or, a number of reward points equivalent to the debited amount may be credited to the first user. The crediting of funds or points to the payment account of the first user 102 is explained later with reference to FIG. 8.

An example representation of an online interface provisioned by the first issuer 112 is explained next with reference to FIG. 4A.

Figure 4A:
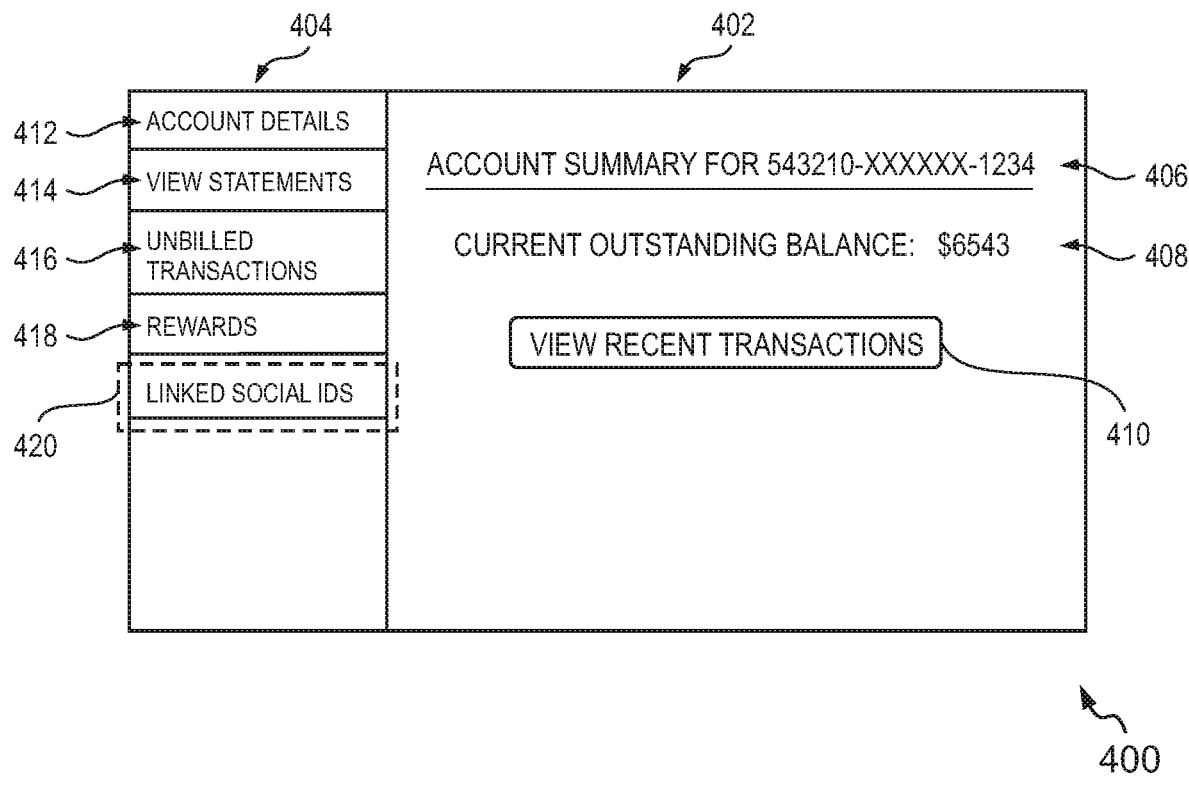
FIG. 4A shows a simplified representation of a User Interface (UI) associated with an online interface provided by a first issuer, in accordance with an example embodiment of the present disclosure.
Figure 4B:
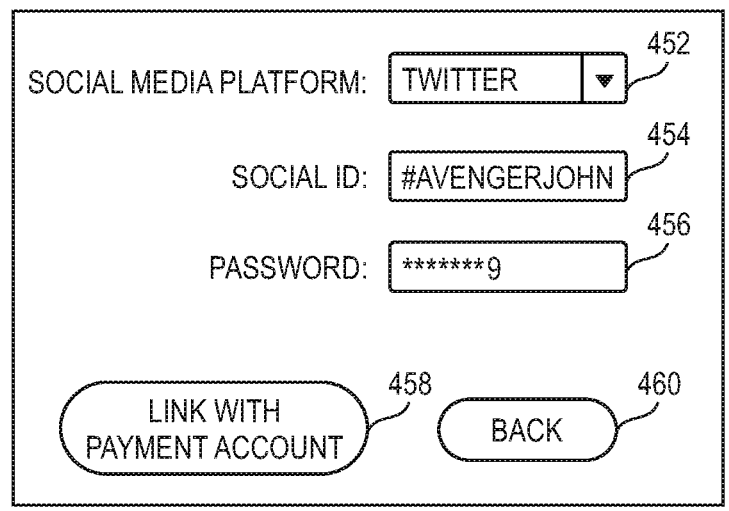
FIG. 4B shows a simplified representation of a UI capable of facilitating linking of social IDs of users to their respective payment accounts, in accordance with an example embodiment of the present disclosure.

FIG. 4A shows a simplified representation of a User Interface (UI) 400 associated with an online interface provided by the first issuer 112, in accordance with an example embodiment of the present disclosure. As explained with reference to FIGS. 1 and 2, the first issuer 112 (i.e. an issuing bank) in which the first user 102 maintains a payment account, may provide an online interface to a plurality of users for performing various financial transaction activities, such as checking balance, transferring funds, and the like. A user may use an electronic device to access the online interface provided by the first issuer 112 using a Web browser application installed in the user's electronic device. For example, the first user 102 may use a Web browser application installed in the electronic device 108 (shown in FIG. 1) to access the online interface provided by the first issuer 112.

The UI 400 corresponds to a UI associated with a payment account of the first user 102. In the illustrative example shown in FIG. 4A, the payment account corresponds to an account associated with a credit card of the first user 102. More specifically, the UI 400 corresponds to a Website associated with a credit card issuing bank, also referred to herein as an issuer (i.e., the first issuer 112). In some embodiments, the UI 400 may correspond to a Web page of a Website associated with the payment card interchange network, such as for example Mastercard® interchange network (i.e. a Website associated with Mastercard International Incorporated®). The UI 400 may be presented to the first user 102 subsequent to user login into the payment account, i.e. the credit card account. The UI 400 is depicted to include a content portion 402 and a menu portion 404.

The content portion 402 is exemplarily depicted to display a header 406 associated with text 'ACCOUNT SUMMARY FOR 543210-XXXXXX-1234', or more specifically, account summary of the payment account associated with a user's payment card, or more specifically a credit card associated with number 543210-XXXXXX-1234, where X corresponds to a positive integer. The account summary is depicted to display a current outstanding balance 408 (exemplarily depicted as $6543) and an option 410 displaying text 'VIEW RECENT TRANSACTIONS'. The first user 102 may provide a selection of the option 410 to view recent purchase transactions executed by the first user 102 using the payment card ending 1234.

The menu portion 404 is depicted to display several menu options, such as options 412, 414, 416, 418 and 420 associated with text 'ACCOUNT DETAILS', 'VIEW STATEMENTS', 'UNBILLED TRANSACTIONS', 'REWARDS' AND 'LINKED SOCIAL IDS', respectively. The first user 102 may provide a click input or a touch input on the option 420 (exemplarily depicted in a dotted box) to provide a selection of the 'LINKED SOCIAL IDS' menu option. In an example scenario, the selection of the option 420 is configured to cause display of another UI capable of facilitating linking of social IDs to the payment account of the first user 102. The UI facilitating linking of social IDs to the payment account is shown in FIG. 4B.

FIG. 4B shows a simplified representation of a UI 450 capable of facilitating linking of social IDs of users to their respective payment accounts, in accordance with an example embodiment of the present disclosure. The UI 450 may be displayed to the user on the user's electronic device subsequent to the selection of the option 420 (shown in FIG. 4A).

The UI 450 depicted to display three form fields 452, 454 and 456, associated with text 'SOCIAL MEDIA PLATFORM', 'SOCIAL ID' and 'PASSWORD', respectively. The form field 452 is depicted to be associated with a drop-down menu, capable of presenting a list of common social media platforms, such as 'Facebook®', 'Twitter®', 'LinkedIn®', 'Quora®', 'SnapChat®', and the like. The form fields 454 and 456 are depicted to be capable of receiving a textual input from the users. As an illustrative example, the first user 102 is depicted to have selected 'TWITTER' as the social media platform in the form field 452, a text input '#AVENGERJOHN' in the form field 454 and an eight-character password, as exemplarily depicted using '********9' in the form field 456.

The UI 450 is further depicted to display two selectable options 458 and 460 associated with text 'LINK WITH PAYMENT ACCOUNT' and 'BACK'. The first user 102 may provide a click or a touch input on the option 458 to provision a request to link the user's Twitter® social ID '#AVENGERJOHN' with the payment account associated with the number '543210-XXXXXX-1234'.

The first issuer 112, on account of being in operative communication with the social media platform 'Twitter®' may provision the social ID and the password (i.e. entries in the form fields 454 and 456, respectively) to the social media platform (i.e. Twitter®) to authenticate the first user 102. Furthermore, the first issuer 112 may also authenticate the first user 102 using any 3D-Secure (3DS) authentication mechanism. In an illustrative example, a pop-up may be displayed to the first user 102 requesting the first user 102 to input a One-Time Password (OTP) provisioned on registered contact identifier of the first user 102. The first user 102 may input the OTP to authenticate an identity to the first issuer 112.

Subsequent to the successful authentication of the password as well as the OTP, the Twitter® social ID of the first user 102 may be linked with the payment account of the first user 102. In some embodiments, the linked social ID may be activated after a predefined time period, such as for example, after a two-day period has lapsed. After successful linking of the social ID to the payment account and its subsequent activation, the social ID of the first user 102 may be used to validate the user during financial transactions from the payment account of the first user 102.

In an embodiment, the first user 102 may be provided with an option to link more social IDs with the payment account subsequent to successful linking of the Twitter® social ID with the payment account. It is noted that the dual authentication of the identity of the first user 102 is performed for each social ID linked to the payment account of the first user 102. In at least one example embodiment, the first issuer 112 may be configured to provision the information related to the first user 102 to the server system 150 (shown in FIG. 1). The information related to the first user 102 includes one or more social IDs of the first user 102 linked to the payment account of the first user 102. In an illustrative example, the server system 150 may be configured to store the information related to the first user 102 in a mapping file. An example representation of the mapping file in shown in FIG. 5.

Figure 5:
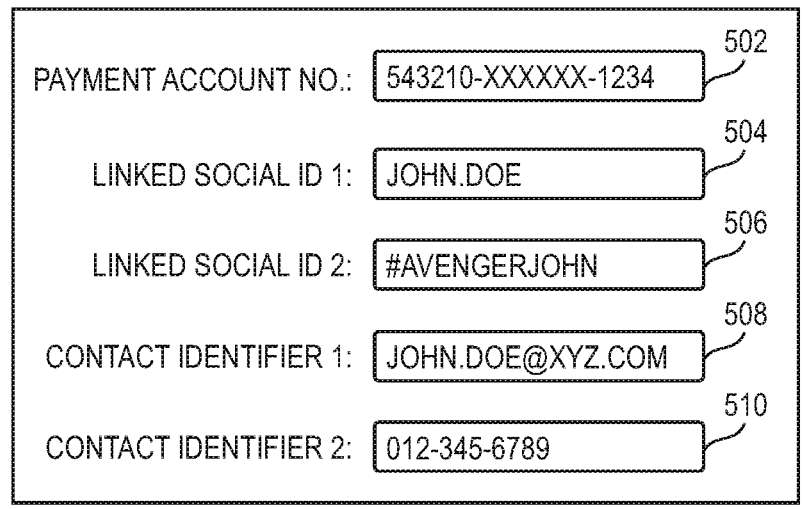
FIG. 5 shows a simplified representation of a mapping file stored corresponding to the first user, in accordance with an example embodiment of the present disclosure.

FIG. 5 shows a simplified representation of a mapping file 500 stored corresponding to the first user 102, in accordance with an example embodiment of the present disclosure. As explained with reference to FIGS. 4A and 4B, the first user 102 may access the online interface provisioned by the first issuer 112 and link one or more social IDs to the payment account associated with the first user 102. An authentication of the first user 102 is performed for each linked social ID by the first issuer 112. Subsequent to successful authentication of the first user 102 and the activation of the social IDs, the first issuer 112 provisions the information related to the linked social IDs of the first user 102 to the server system 150. In an illustrative example, the first user 102 may have linked two social IDs: 'JOHN.DOE' and '#AVENGERJOHN' to the payment account associated with number '543210-XXXXXX-1234'. The server system 150 may be configured to map the social IDs to the payment account and store the information in a 'mapping file', such as the mapping file 500. It is noted the term 'mapping file' as used herein refers to the information related to social IDs mapped to the payment account and not to a specific form of storage, such as a file format of storage. Indeed, the information may be stored in any form, such as a linked list, a tree-node structure, a textual transcript, a tabular form and the like.

Accordingly, the mapping file 500 shows a simplified representation of the information related to the linked social IDs and the payment account of the first user 102. More specifically, the mapping file 500 includes a form field 502 displaying the payment account number '543210-XXXXXX-1234', a form field 504 displaying a first linked social ID 'JOHN.DOE', a form field 506 displaying a second linked social ID '#AVENGERJOHN', a form field 508 displaying a first contact identifier 'JOHN.DOE@XYZ.COM' and a form field 510 displaying second contact identifier '012-345-6789'. As explained with reference to FIG. 1, the contact identifier entries in the form fields 508 and 510 facilitate contact with the first user 102. The information related to the mapping of the social IDs of the first user 102 to the payment account of the first user 102 facilitates sharing of reward points between the first user 102 and one or more other users, such as the second user 104 (shown in FIG. 1). It is noted that the second user 104 may similarly have linked one or more social IDs with a respective payment account maintained at the second issuer 114 (or even at the first issuer 112) and the second issuer 114 may have provisioned the information related to the second user 104 to the server system 150. The server system 150 may similarly store the information related to linked social IDs of the second user 104 in another mapping file, such as the mapping file 500.

In an example scenario, the first user 102 may wish to offer a fixed number of reward points for redemption to other users. In an illustrative example, the first user 102 may have some reward points, which are nearing expiry, and accordingly instead of allowing the reward points to lapse or engage in unintentional purchases to redeem the reward points, the first user 102 may choose to offer those reward points for redemption by other users. The offer for redemption of the fixed number of reward points may be posted on the social media platform as exemplarily shown in FIG. 6A.

Figure 6A:
FIG. 6A shows a representation of a message posted by the first user on a social media platform, in accordance with an example embodiment of the present disclosure.

FIG. 6A shows a representation of a message 600 posted by the first user 102 on a social media platform, in accordance with an example embodiment of the present disclosure. The message 600 posted by the first user 600 corresponds to an offer for redeeming 150 reward points related to 'Brand 1' (i.e. an example reward program entity, such as an airline for instance). Accordingly, the message 600 is exemplarily depicted to be associated with text: "HELLO FRIENDS, I HAVE 150 REWARD POINTS FOR 'BRAND 1' WHICH ARE GOING TO EXPIRE THIS WEEK, IF YOU WANT TO REDEEM THESE POINTS PLEASE ACCESS THIS HASHTAG #AVENGERJOHN"

The message 600 including the offer to redeem 150 reward points from the first user 102 may be visible to a plurality of users of the social media platform as per the message viewing setting configured by the first user 102. The message 600 includes a user-selectable option 602, i.e. linked text '#AVENGERJOHN', which upon selection by an interested user may initiate a request for reward points redemption. It is noted that the option 602 is depicted to be embodied as an actionable link (i.e. a hyperlink) for illustration purposes.

In an example scenario, the second user 104 (say, 'Donald Draper') may be interested in redeeming the reward points from the first user 102. The second user 104 may respond to the message 600, for example, with another message (not shown in FIG. 6) including text 'HI JOHN, I AM INTERESTED IN REDEEMING THESE REWARD POINTS' and click on the option 602 to initiate the reward points redemption request.

In at least one example embodiment, the selection of the option 602, may cause the social media platform to invoke a notification for seeking approval of the first user 102 for redemption of the reward points. An example notification provisioned to the first user 102 is shown in FIG. 6B.

Figure 6B:
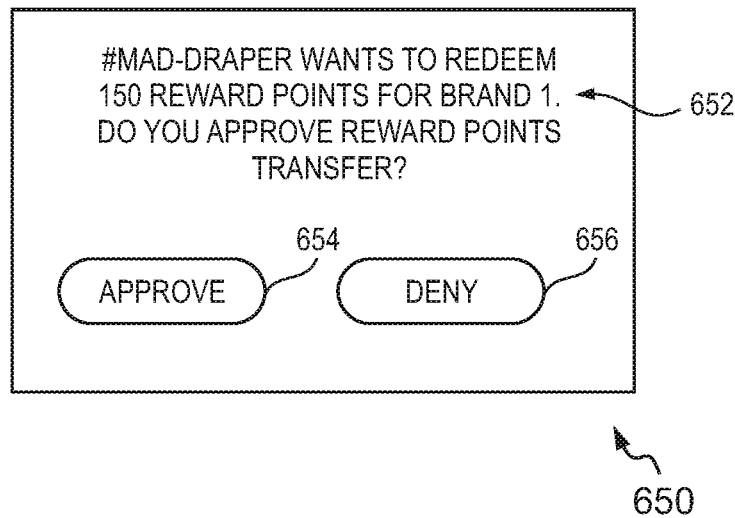
FIG. 6B shows a representation of a notification provisioned to the first user by the social media platform, in accordance with an example embodiment of the present disclosure.

FIG. 6B shows a representation of a notification 650 provisioned to the first user 102 by the social media platform, in accordance with an example embodiment of the present disclosure. As explained with reference to FIG. 6A, the first user 102 may post a message, such as the message 600, offering reward points for redemption. An interested user, such as the second user 104, may select an option included within the message to request reward points redemption. The selection of the option, such as the option 602 shown in FIG. 6A, may cause the social media platform to invoke an SQL query which may trigger a notification, such as the notification 650. In an example embodiment, the notification 650 is embodied as a Social Message Service (SMS). The notification 650 is configured to seek approval of the first user 102 for redemption of the reward points by the second user 104. It is noted that the first user 102 may have provided contact identifiers such as a phone number or an Email ID during creation of a social media account. The social media platform may be configured to utilize such contact identifiers for provisioning notifications, such as the notification 650, to the first user 102.

The notification 650 is exemplarily depicted to be include text 652 "#MAD-DRAPER WANTS TO REDEEM 150 REWARD POINTS FOR BRAND 1. DO YOU APPROVE REWARD POINTS TRANSFER?". The notification 652 may further include two options 654 and 656 associated with text 'APPROVE' and 'DENY', respectively. The first user 102 may choose the option 654 to approve the request from the second user 104 to redeem 150 reward points.

In at least one example embodiment, the approval of the request for reward points redemption may cause invoking of an API call from the electronic device 108 (shown in FIG. 1) associated with the first user 102 to the first issuer 112. The first issuer 112 may be configured to provision the request to the server system 150 (shown in FIG. 1). The server system 150 is configured to receive the request for reward points redemption from the first issuer 112.

As explained above, the request for the reward points redemption is initiated by the second user 104 and approved by the first user 102. After receiving the request, the server system 150 may be caused to identify a social ID used by the second user 104 to initiate the request for rewards point redemption on the social media platform. In the illustrative example explained with reference to FIG. 6B, the social ID of the second user 104 is identified as '#MAD-DRAPER'. Subsequently, the server system 150 is configured to facilitate transfer of the fixed number of reward points from the first user 102 to the second user 104 based on the mapping file and the social ID of the second user 104. More specifically, the server system 150 is configured to identify the first user 102 from the mapping file based on the social ID from which the approval of the reward points redemption request is received. In an illustrative example, the social ID of the first user 102 is identified as "#AVENGERJOHN". Thereafter, a reward point account associated with the first user 102 and the payment account of the first user 102 with the first issuer 112 is identified. Similarly, the second user 104 is identified from the social ID of the second user 104 (i.e. '#MAD-DRAPER'). The reward points account associated with the second user 104 and the payment account of the second user with the second issuer 114 is also identified. Thereafter, the fixed number of reward points are transferred from a first rewards point account associated with the first user 102 to a second rewards point account associated with the second user 104. The second user 104 may access an online interface associated with the second issuer 114 over the network 106 using the electronic device 110 (shown in FIG. 1). In one embodiment, a UI such as the UI 400 shown in FIG. 4A may be presented to the second user 104. The second user 104 may select an option, such as the option 418 shown in FIG. 4A to view the reward points in the payment account. An example UI displaying the reward points to the second user 104 subsequent to the transfer of the reward points from the first user 102 is shown in FIG. 7.

Figure 7:
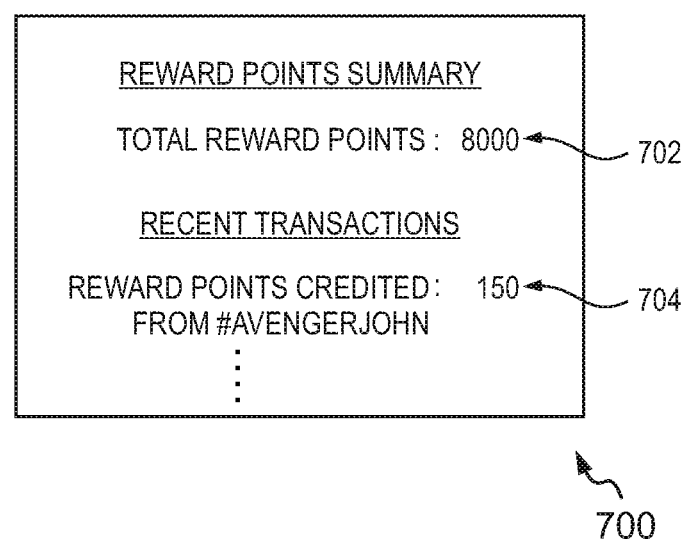
FIG. 7 shows a representation of a UI displaying reward points to the second user, in accordance with an example embodiment of the present disclosure.

FIG. 7 shows a representation of a UI 700 displaying reward points to the second user 104, in accordance with an example embodiment of the present disclosure. The UI 700 may be associated with the online interface of the second issuer 114 (shown in FIG. 1) and may be presented to the second user 104 by the second issuer 114 subsequent to the access of an option, such as the option 418 (shown in FIG. 4A) by the second user 104 on the online interface. The UI 700 depicts a reward points summary in form of a total reward points 702 available in the payment account of the second user 104. The total reward points are exemplarily depicted to be 8000. The UI 700 further depicts a listing of recent transactions which led to the accrual of reward points. An entry 704 associated with the recent transactions is depicted to capture the reward points transfer from the reward points account associated with the first user 102 to the second user's reward point account.

In at least one example embodiment, the server system 150 is further configured to compute a price of redeeming the fixed number of reward points based, at least in part, on a predefined cost per reward point. For example, if the predefined cost per reward point is 0.50 cents, then the price for redeeming 150 reward points is computed as 75 US Dollars by the server system 150.

In some embodiments, the reward points offered for redemption may be associated with a currency (for example, a first currency) different than a currency (for example, a second currency) in which the second user 104 may make a payment to redeem the reward points. In such a scenario, the server system 150 is configured to determine a prevailing currency exchange rate between the first currency and the second currency, and correct the price based on the prevailing currency exchange rate. For example, the fixed number of reward points offered for redemption may be associated with US Dollar currency, i.e. the reward points were accrued based on financial transactions executed in US Dollar currency. If a user in India wishes to purchase the reward points using a payment account associated with Indian Rupee currency, then the server system 150 may be configured to determine a prevailing currency exchange rate, for example, 1 US Dollar=65 Indian Rupees, and thereafter correct the 75 US Dollar price for redeeming 150 reward points to 4875 Indian Rupees (i.e. 75 US Dollars×65 Conversion Rate) by using the prevailing currency exchange rate of 65, between the US Dollar and the Indian Rupee.

The server system 150 is further configured to notify the price to the second user 104. It is noted that the price is notified to the second user 104 on a contact identifier of the second user 104 associated with the social ID of the second user 104. Accordingly, the server system 150 may first identify the social ID of the second user 104 from the request for reward points redemption, and, thereafter determine the contact identifier of the second user 104 from the respective social media platform. The price may thereafter be notified to the second user 104 on the contact identifier of the second user 104.

Thereafter, a debiting of an amount equivalent to the price of redeeming the fixed number of reward points is initiated from the payment account of the second user 104. The amount is debited subsequent to a receipt of an approval provided by the second user 104 in response to the price notification. The server system 150 is further configured to facilitate crediting the payment account of the first user 102 with the amount debited from the payment account of the second user 104. In some embodiments, the first user 102 may choose to receive reward points instead of the amount debited from the payment account of the second user 104. In such a case, the server system 150 may be configured to convert the amount into equivalent number of reward points based on the predefined cost per reward point and credit the payment account (or more specifically, the reward points account) of the first user 102 with the reward points.

In one embodiment, subsequent to successful crediting of funds or reward points to the payment account of the first user 102, the fixed number of reward points are transferred from a first rewards point account associated with the first user 102 to a second rewards point account associated with the second user 104. A sequence flow diagram illustrating transfer of funds for reward points redemption is explained with reference to FIG. 8.

Figure 8:
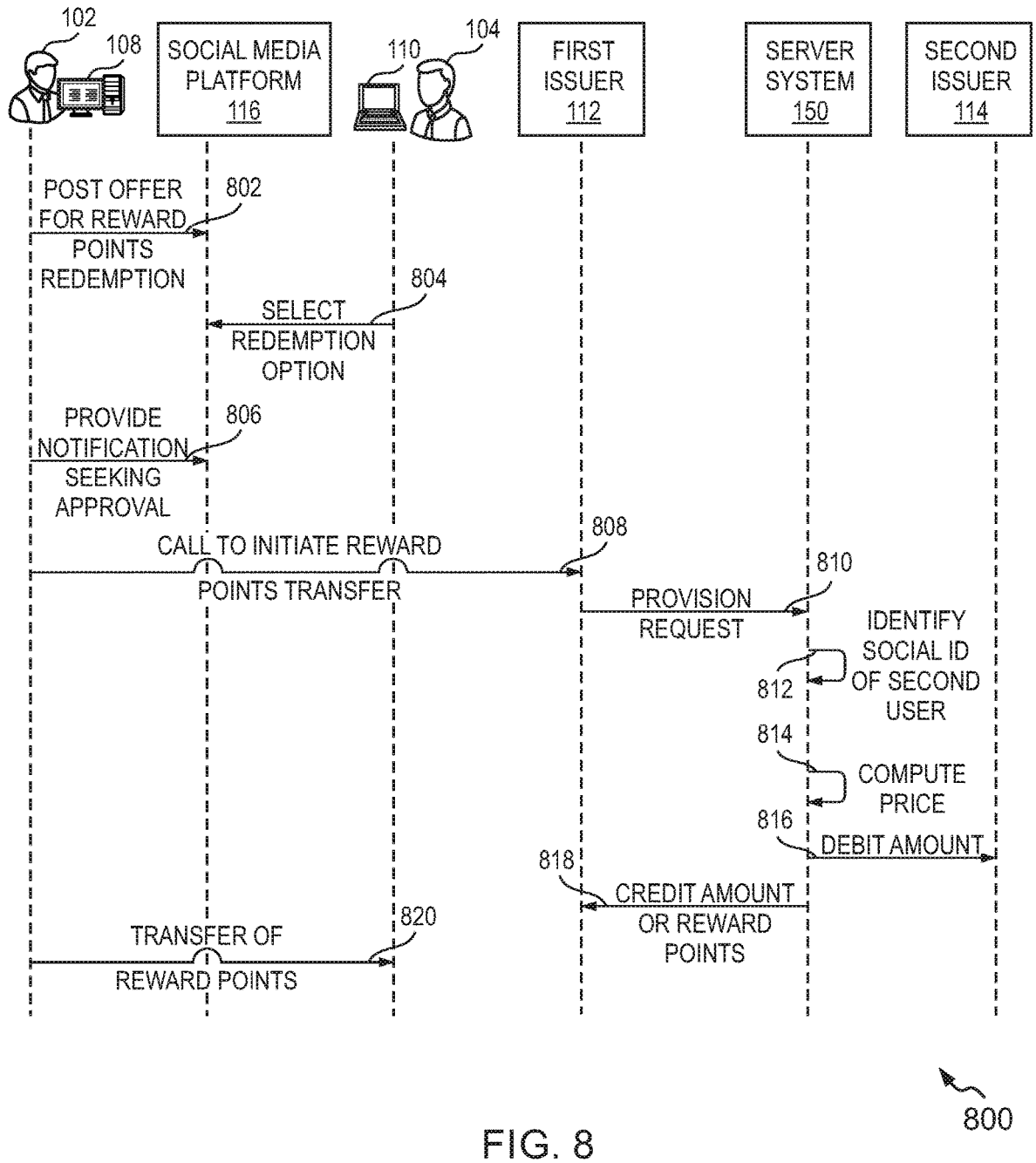
FIG. 8 represents a sequence flow diagram for illustrating the server system of FIG. 1 facilitating crediting a payment account of the first user for redemption of reward points by the second user, in accordance with an example embodiment of the present disclosure.

FIG. 8 represents a sequence flow diagram 800 for illustrating the server system 150 of FIG. 1 facilitating crediting a payment account of the first user 102 for redemption of reward points by the second user 104, in accordance with an example embodiment of the present disclosure. The sequence flow diagram 800 starts at 802.

At 802, the first user 102 using the electronic device 108 accesses the social media platform 116 and posts a message on the media platform 116. The message corresponds to an offer for redemption of a fixed number of reward points. The offer for redemption of the fixed number of reward points posted on the social media platform 116 may include an option, which when selected may initiate a request for reward points redemption.

At 804, the second user 104 using the electronic device 110 accesses the social media platform 116 and selects the option in the offer to request redemption of the fixed number of reward points of the first user 102.

At 806, the social media platform 116 provisions a notification to the first user 102 to seek an approval of the request for reward points redemption by the second user 104. The provisioning of the notification may be performed as explained with reference to FIG. 6B.

At 808, the approval of the request by the first user 102 causes invoking of an Application Programming Interface (API) call to the first issuer 112 to initiate the transfer of the fixed number of reward points from the first user 102 to the second user 104.

At 810, the first issuer 112 provisions the request for reward points redemption to the server system 150.

At 812, the server system 150 identifies the social ID of the second user 104 from the request for reward points redemption.

At 814, the server system 150 computes a price for redeeming the fixed number of reward points based a predefined cost per reward point. The server system 150 may also be configured to correct the price based on a prevailing currency exchange rate, if the fixed number of reward points are associated with a first currency and the payment account of the second user 104 is associated with a second currency different than the first currency. The computation of the price and its subsequent correction, if needed, may be performed as explained above.

In some embodiments, the server system 150 is configured to notify the price to the second user 104 and seek approval from the second user 104. The second user 104 may be identified by the server system 150 based on the social ID of the second user 104. The price notification may be provided on a contact identifier associated with the social ID of the second user 104.

At 816, the server system 150 debits an amount equivalent to the price from the payment account of the second user 104 maintained at the second issuer 114.

At 818, the server system 150 determines whether the first user 102 prefers the transfer of funds (i.e. the debited amount) or equivalent reward points and credits the payment account of the first user 102 maintained at the first issuer 112.

At 820, the server system 150 facilitates transfer of the fixed number of reward points from the first user 102 to the second user 104 in response to the reward points redemption request from the second user 104.

Accordingly, the server system 150 enables the first user 102 to redeem the reward points that are about to expire without engaging in purchase transactions for redeeming the rewards points. Further, the second user 104 is also able to acquire the reward points from the first user 102 without engaging in purchase transactions aimed towards gaining reward points to meet reward point milestones. Thus, the sharing of reward points is mutually beneficial to the both the first user 102 and the second user 104 and moreover, the sharing is facilitated by the server system 150 using social media, which the users are fairly familiar with, thereby adding to the convenience in sharing of reward points. A method for facilitating sharing of reward points is explained with reference to FIG. 9.

Figure 9:
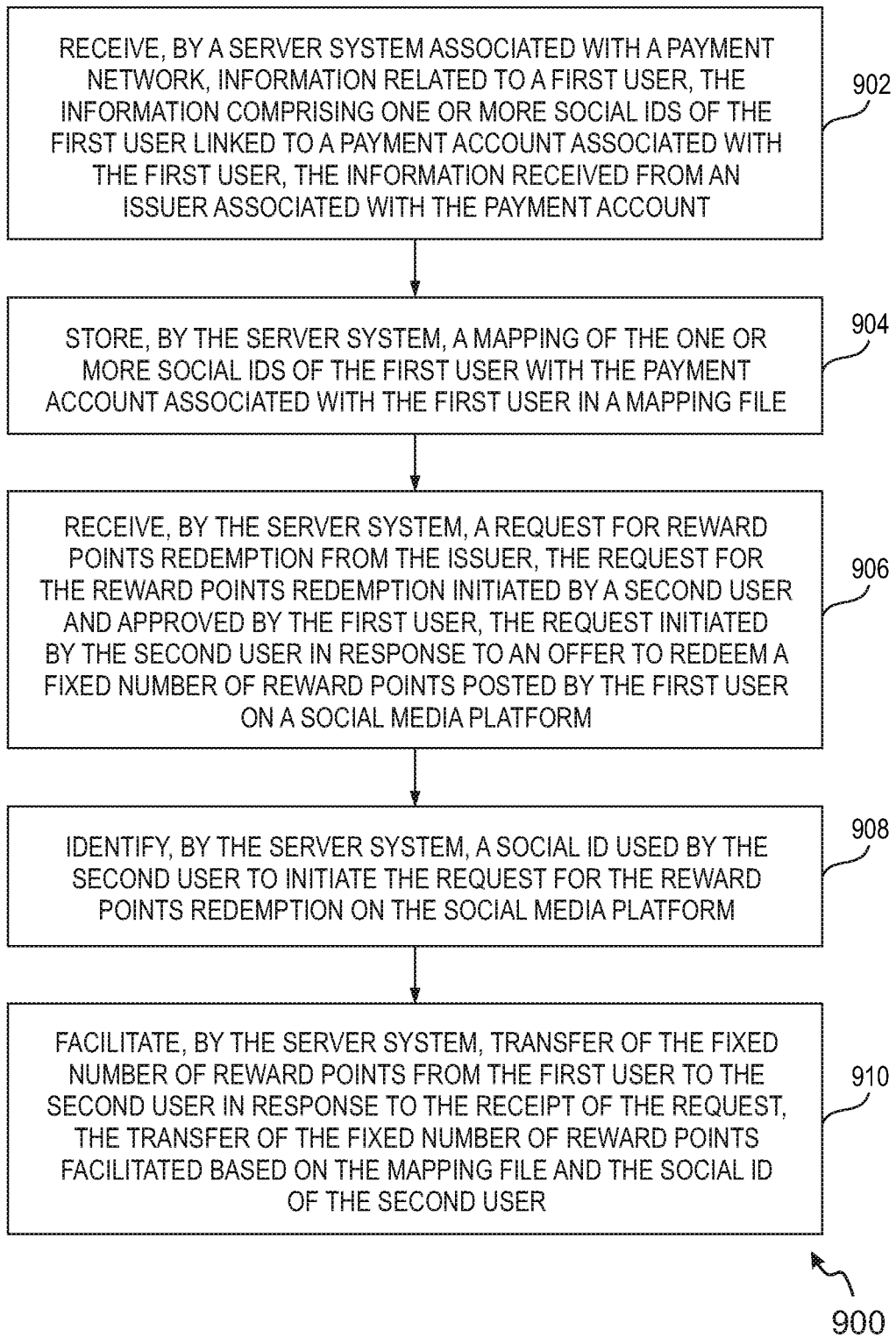
FIG. 9 illustrates a flow diagram of a method for facilitating sharing of reward points, in accordance with an example embodiment of the present disclosure.

FIG. 9 illustrates a flow diagram of a method 900 for facilitating sharing of reward points, in accordance with an example embodiment of the present disclosure. The method 900 depicted in the flow diagram may be executed by, for example, a server system such as the server system 150 explained with reference to FIGS. 1 to 8. Operations of the flow diagram 900, and combinations of operation in the flow diagram 900, may be implemented by, for example, hardware, firmware, a processor, circuitry and/or a different device associated with the execution of software that includes one or more computer program instructions. In at least one example embodiment, the server system 150 corresponds to a payment server associated with a payment network, such as the payment network 145 (for example, Mastercard® payment system interchange network). It is noted that the operations of the method 900 can be described and/or practiced by using other server systems, such as the issuer server 112 or the issuer server 114 shown in FIG. 1. The method 900 starts at operation 902.

At 902, the method 900 includes receiving, by a server system associated with a payment network, information related to a first user from an issuer associated with a payment account of the first user. The first user may access an online interface of an issuing bank, such as a payment card issuing bank, referred to herein as an issuer, and link one or more social IDs to the payment account of the first user maintained at the issuer. The linking of social IDs of the first user to the payment account may be performed as explained with reference to FIGS. 4A and 4B. After successful linking of the social IDs to the payment account, the social IDs of the first user may be used to facilitate financial transactions from the payment account of the first user. It is noted that the authentication of the identity of the first user is performed for each social ID linked to the payment account of the first user. Moreover, the authentication is performed by the issuer as well as the respective social media platform for each social ID to be linked to the payment account. The information related to the linked social IDs of the first user along with the payment account information may then be provisioned by the issuer to the server system.

At 904, the method 900 includes storing a mapping of the one or more social IDs of the first user with the payment account associated with the first user in a mapping file by the server system. An example mapping file storing a mapping of the social IDs linked to the payment account of the first user is shown in FIG. 5.

In an example scenario, the first user may wish to offer at least a portion of the reward points for redemption to other users. For example, the reward points of the first user may be nearing expiry. In such a scenario, the first user may post an offer to redeem a fixed number of reward points (i.e. the reward points, which are about to expire) on a social media platform. In one embodiment, the offer to redeem the fixed number of reward points posted by the first user on the social media platform includes an option capable of being selected by an interested user to request redemption of the fixed number of reward points. In an example scenario, a second user may be interested in redeeming the reward points offered for redemption by the first user. Accordingly, the second user may select the option included within the post of the first user on the social media platform. In one embodiment, the selection of the option by the second user is configured to invoke a notification to the first user. For example, the social media platform may be configured to invoke a notification and provision the notification to the first user to seek approval of the first user in relation to the request for the reward points redemption initiated by the second user. The notification may include an option to approve or to deny approval for the rewards point redemption. In one embodiment, the approval of the reward points redemption request by the first user may cause provisioning of an API call to the issuer, which in turn, may be configured to provision the request to the server system.

At 906, the method 900 includes receiving a request for reward points redemption by the server system from the issuer. The request for the reward points redemption is initiated by a second user and approved by the first user. As explained above, the request is initiated by the second user in response to an offer to redeem a fixed number of reward points posted by the first user on a social media platform. At 908, the method 900 includes identifying, by the server system, a social ID used by the second user to initiate the request for the reward points redemption on the social media platform.

At 910, the method 900 includes facilitating, by the server system, transfer of the fixed number of reward points from the first user to the second user in response to the receipt of the request. The transfer of the fixed number of reward points is facilitated based on the mapping file and the social ID of the second user. More specifically, the server system is configured to identify the first user from the mapping file based on the social ID from which the approval of the reward points redemption request is received. Thereafter, a reward point account associated with the first user and the payment account of the first user with the issuer is identified. Similarly, the second user is identified from the social ID of the second user. The reward points account associated with the second user and the payment account of the second user with a respective issuer is also identified. Thereafter, the fixed number of reward points are transferred from a first rewards point account associated with the first user to a second rewards point account associated with the second user.

In one embodiment, the server system may be configured to compute a price of redeeming the fixed number of reward points based, at least in part, on a predefined cost per reward point. Further, in some embodiments, the reward points offered for redemption may be associated with a currency (for example, a first currency) different than a currency (for example, a second currency) in which the second user may make a payment to redeem the reward points. In such a scenario, the server system is configured to determine a prevailing currency exchange rate between the first currency and the second currency, and correct the price based on the prevailing currency exchange rate. The determination of the price and subsequent correction, if needed, may be performed as explained with reference to FIG. 1. The server system is further configured to notify the price to the second user. It is noted that the price is notified to the second user on a contact identifier of the second user associated with the social ID of the second user. Thereafter, a debiting of an amount equivalent to the price of redeeming the fixed number of reward points is initiated from the payment account of the second user. The amount is debited subsequent to a receipt of an approval provided by the second user in response to the price notification.

The server system is configured to facilitate crediting the payment account of the first user with the amount debited from the payment account of the second user. In some embodiments, the first user may choose to receive reward points instead of the amount debited from the payment account of the second user. In such a case, the server system may be configured to convert the amount into equivalent number of reward points based on the predefined cost per reward point and credit the payment account (or more specifically, the reward points account) of the first user with the reward points. In one embodiment, subsequent to successful crediting of funds or reward points to the payment account of the first user, the fixed number of reward points are transferred from a first rewards point account associated with the first user to a second rewards point account associated with the second user.

Figure 10:
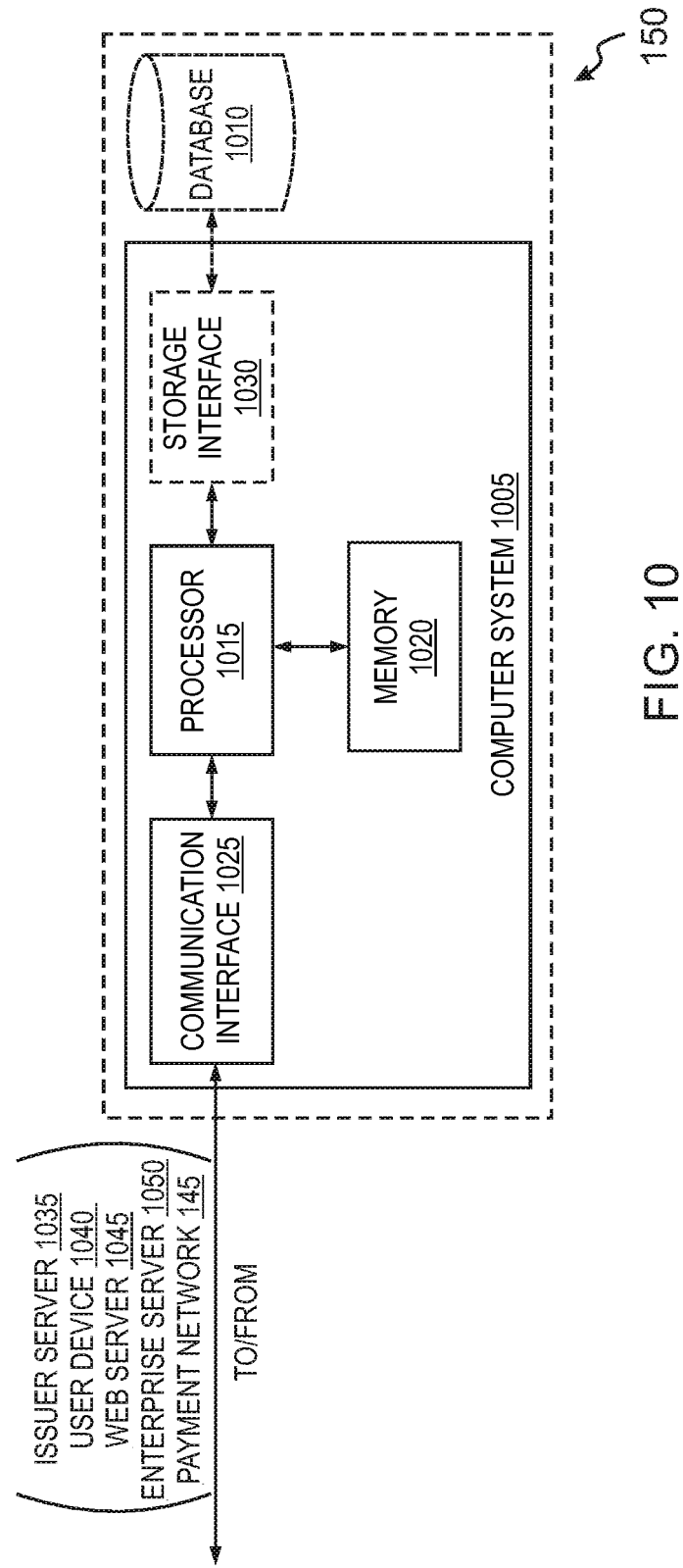
FIG. 10 is a simplified block diagram of a server system used for facilitating sharing of reward points between users, in accordance with an example embodiment of the present disclosure.

FIG. 10 is a simplified block diagram of a server system 150 used for facilitating sharing of reward points between users, in accordance with an example embodiment of the present disclosure. The server system 150 is an example of a server system that is a part of a payment network, such as the payment network 145 explained with reference to FIG. 1. Examples of the server system 150 includes, but not limited to, an issuer server and a payment server. The server system 150 includes a computer system 1005 and a database 1010.

The computer system 1005 includes at least one processor 1015 for executing instructions. Instructions may be stored in, for example, but not limited to, a memory 1020. The processor 1015 may include one or more processing units (e.g., in a multi-core configuration).

The processor 1015 is operatively coupled to a communication interface 1025 such that the computer system 1005 is capable of communicating with a remote device such as issuer server 1035 (e.g., the first issuer 112 or the second issuer 114), a user device 1040 (e.g., the electronic device 108 or the electronic device 110), a Web server 1045 hosting a social media platform (e.g., a Web server hosting the social media platform 116 or the social media platform 118), an enterprise server 1050 associated with the reward program entity, or any entity within the payment network 145. For example, the communication interface 1025 may enable reception of information related to linking of social IDs of the users with their respective payment accounts from the issuers associated with the payment accounts. The communication interface 1025 may also enable reception of request for reward points redemption from one or more issuers. Furthermore, the communication interface 1025 may enable provisioning of a price notification to users using contact identifiers associated with social IDs of the users.

The processor 1015 may also be operatively coupled to the database 1010. The database 1010 is any computer-operated hardware suitable for storing and/or retrieving data, such as, but not limited to, transaction data generated as part of sales activities conducted over the bankcard network including data relating to merchants, account holders or customers, and purchases. The database 1010 may also store information related to a plurality of user's payment accounts. Each payment account data includes at least one of a user name, a user address, payment card related information, PIN, and other account identifiers. The database 1010 may also store merchant data including a merchant identifier that identifies each merchant registered to use the payment network 145, and instructions for settling transactions including merchant bank account information (e.g., a plurality of payment accounts related to POS terminals associated with merchants).

The database 1010 is configured to store records of users who have opted for the sharing of reward points using their respective social IDs. The database 1010 is further configured to store mapping files, such as the mapping file 500 shown in FIG. 5, for a plurality of users. The database 1010 may also maintain track of reward points available in various reward points accounts for a plurality of users.

The database 1010 may include multiple storage units such as hard disks and/or solid-state disks in a redundant array of inexpensive disks (RAID) configuration. The database 1010 may include a storage area network (SAN) and/or a network attached storage (NAS) system. In some embodiments, the database 1010 is integrated within the computer system 1005. For example, the computer system 1005 may include one or more hard disk drives as the database 1010. In other embodiments, the database 1010 is external to the computer system 1005 and may be accessed by the computer system 1005 using a storage interface 1030. The storage interface 1030 is any component capable of providing the processor 1015 with access to the database 1010. The storage interface 1030 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1015 with access to the database 1010.

The computer system 1005 in conjunction with the database 1010 is configured to perform the various function as explained with reference to the server system 150 in FIGS. 1 and 2. For example, the processor 1015 of the computer system 1005 is configured to generate a mapping file for storing a linking of social IDs of the users with their respective payment accounts. In response to the receipt of a reward points redemption request, the processor 1015 is further configured to compute a price of redeeming reward points and also correct the price based on the prevailing currency exchange rate. In some embodiments, the processor 1015 is configured to notify the price to a user seeking to redeem the reward points. The processor 1015 also facilitates the transfer of reward points from the first user to the second user. The crediting of funds or reward points to the payment account associated with the first user is also facilitated by the processor 1015.

Figure 11:
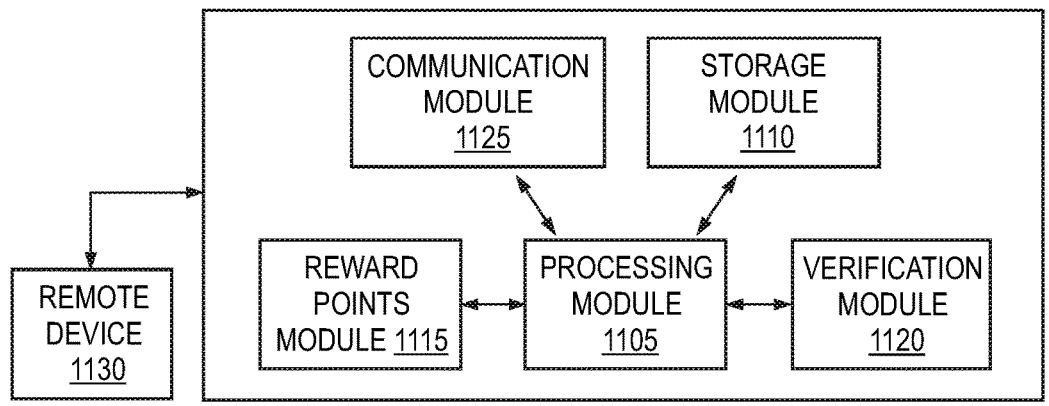
FIG. 11 is a simplified block diagram of an issuer server for facilitating sharing of reward points between users, in accordance with one embodiment of the present disclosure.

FIG. 11 is a simplified block diagram of an issuer server 1100 for facilitating sharing of reward points between users, in accordance with one embodiment of the present disclosure. The issuer server 1100 is an example of the first issuer 112 of FIG. 1 or may be embodied in the first issuer 112. The issuer server 1100 is associated with an issuer bank/issuer, in which a user may have an account, which provides an option to a user to share reward points with other users using user social IDs.

The issuer server 1100 includes a processing module 1105 operatively coupled to a storage module 1110, a reward points module 1115, a verification module 1120 and a communication module 1125. The components of the issuer server 1100 provided herein may not be exhaustive, and that the issuer server 1100 may include more or fewer components than that depicted in FIG. 11. Further, two or more components may be embodied in one single component, and/or one component may be configured using multiple sub-components to achieve the desired functionalities. Some components of the issuer server 1100 may be configured using hardware elements, software elements, firmware elements and/or a combination thereof.

The storage module 1110 is configured to store machine executable instructions to be accessed by the processing module 1105. Additionally, the storage module 1110 stores information related to, contact information of the user, bank account number, BICs, payment card details, internet banking information, PIN, mobile personal identification number (MPIN) for mobile banking, user reward points, social IDs linked to the user account, and the like. This information is retrieved by the processing module 1105 for cross-verification during payment transactions.

The processing module 1105, in conjunction with the verification module 1120, is configured to verify the payment card information, the PIN (e.g., whether the four-digit numeric code matches the PIN issued by the issuer), the sufficient funds in the user payment account, and the like. Upon successful verification only, the processing module 1105 in conjunction with the reward points module 1115 is configured to facilitate linking of the social IDs of the user to the user payment account. Further, the processing module 1105 in conjunction with the reward points module 1115 is configured to facilitate transfer of reward points from the user rewards account to another user's rewards account.

The processing module 1105 is further configured to communicate with one or more remote devices such as a remote device 1130 using the communication module 1125 over a network such as the network 150 or the payment network 145 of FIG. 1. The examples of the remote device 1130 include, a payment server in the payment network 145, the user device 1040, the Web server 1045 hosting a social media platform, the enterprise server 1050 associated with the reward program entity, other computing systems of issuer and the payment network 145, and the like. The communication module 1125 is capable of facilitating such operative communication with the remote devices and cloud servers using API (Application Program Interface) calls.

Figure 12:
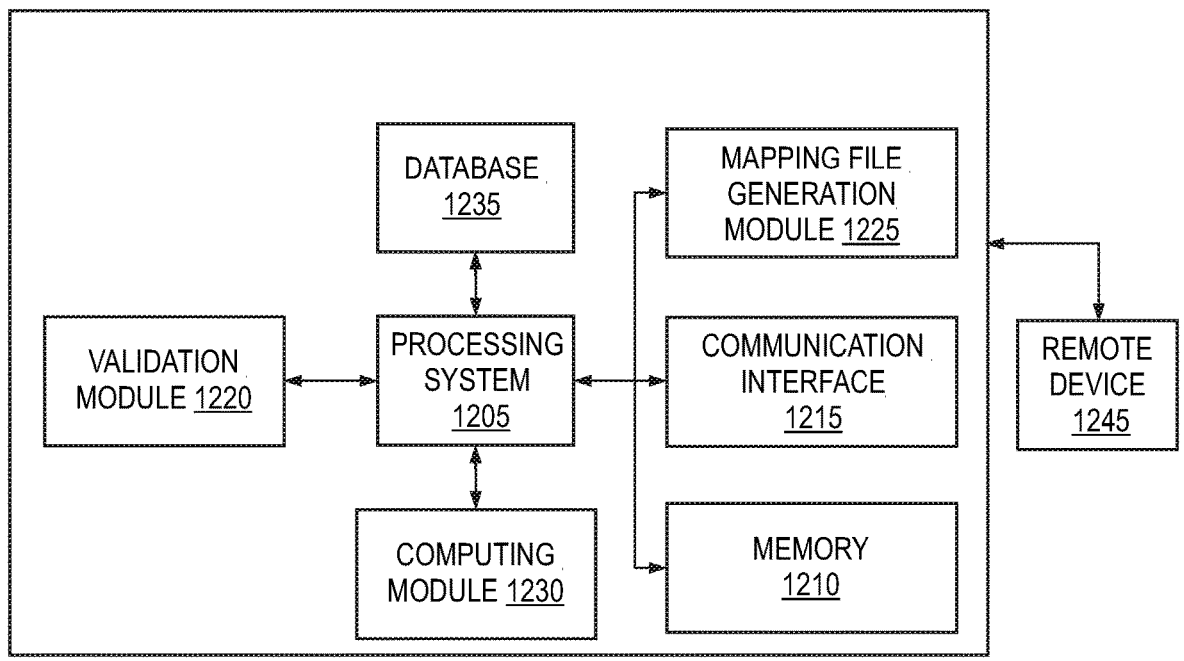
FIG. 12 is a simplified block diagram of a payment server used for facilitating sharing of reward points between users, in accordance with one embodiment of the present disclosure.

FIG. 12 is a simplified block diagram of a payment server 1200 used for facilitating sharing of reward points between users, in accordance with one embodiment of the present disclosure. The payment server 1200 may correspond to a payment server explained with reference to FIG. 1. As explained with reference to FIG. 1, the payment server is associated with the payment network 145. The payment network 145 may be used by the issuer server 1100 and acquirer servers as a payment interchange network. Examples of payment interchange network include, but not limited to, Mastercard® payment system interchange network.

The payment server 1200 includes a processing system 1205 configured to extract programming instructions from a memory 1210 to provide various features of the present disclosure. The payment server 1200 further includes a communication interface 1215, a validation module 1220, a mapping file generation module 1225, a computing module 1230 and a database 1235. The components of the payment server 1200 provided herein may not be exhaustive, and that the payment server 1200 may include more or fewer components than that of depicted in FIG. 12. Further, two or more components may be embodied in one single component, and/or one component may be configured using multiple sub-components to achieve the desired functionalities. Some components of the payment server 1200 may be configured using hardware elements, software elements, firmware elements and/or a combination thereof.

Via the communication interface 1215, the processing system 1205 provisions an online interface to facilitate linking of one or more social IDs of a user (for example, a first user, such as the first user 102 of FIG. 1) to a payment account of the first user. An example UI associated with the online interface for facilitating linking of social IDs to the payment account is shown in FIG. 4B.

A validation module 1220 facilitates an authentication of an identity of the first user for each social ID linked to the payment account of the first user. A mapping file generation module 1225 generates a mapping of the one or more social IDs of the first user with the payment account associated with the first user and stores the mapping file in the database 1235.

Via the communication interface 1215, the processing system 1205 receives a request for reward points redemption initiated by another user (for example, a second user, such as the second user 104 of FIG. 1) in response to an offer to redeem a fixed number of reward points posted by the first user on a social media platform. The validation module 1220 is further configured to identify a social ID used by the second user to initiate the request for the reward points redemption on the social media platform.

A computing module 1230 is configured to compute a price of redeeming the fixed number of reward points. The computing module 1230 may use cost values, stored in the database 1235, for reward points associated with various reward point programs to compute the price for redeeming the fixed number of reward points. The database 1235 may also store currency exchange rates, which may be useful in correcting the price if a difference in currency is observed during reward points conversion. The processing module 1205 is further configured to notify the price to the second user on a contact identifier of the second user associated with the respective social ID. The processing module 1205 is further configured to facilitate transfer of the fixed number of reward points from the first user to the second user subsequent to a debiting of an amount equivalent to the price of redeeming the fixed number of reward points from a payment account of the second user. The transfer of the fixed number of reward points is facilitated based on the mapping file and the social ID of the second user.

The processing system 1205 is further configured to cause display of an UI showing a total number of reward points in the user's payment account along with the credited reward points to the user. In an embodiment, the remote device 1250 may correspond to the issuer server 1035, the user device 1040, the Web server 1045 hosting a social media platform, the enterprise server 1050 associated with the reward program entity, other computing systems of issuer and the payment network and the like.

Figure 13:
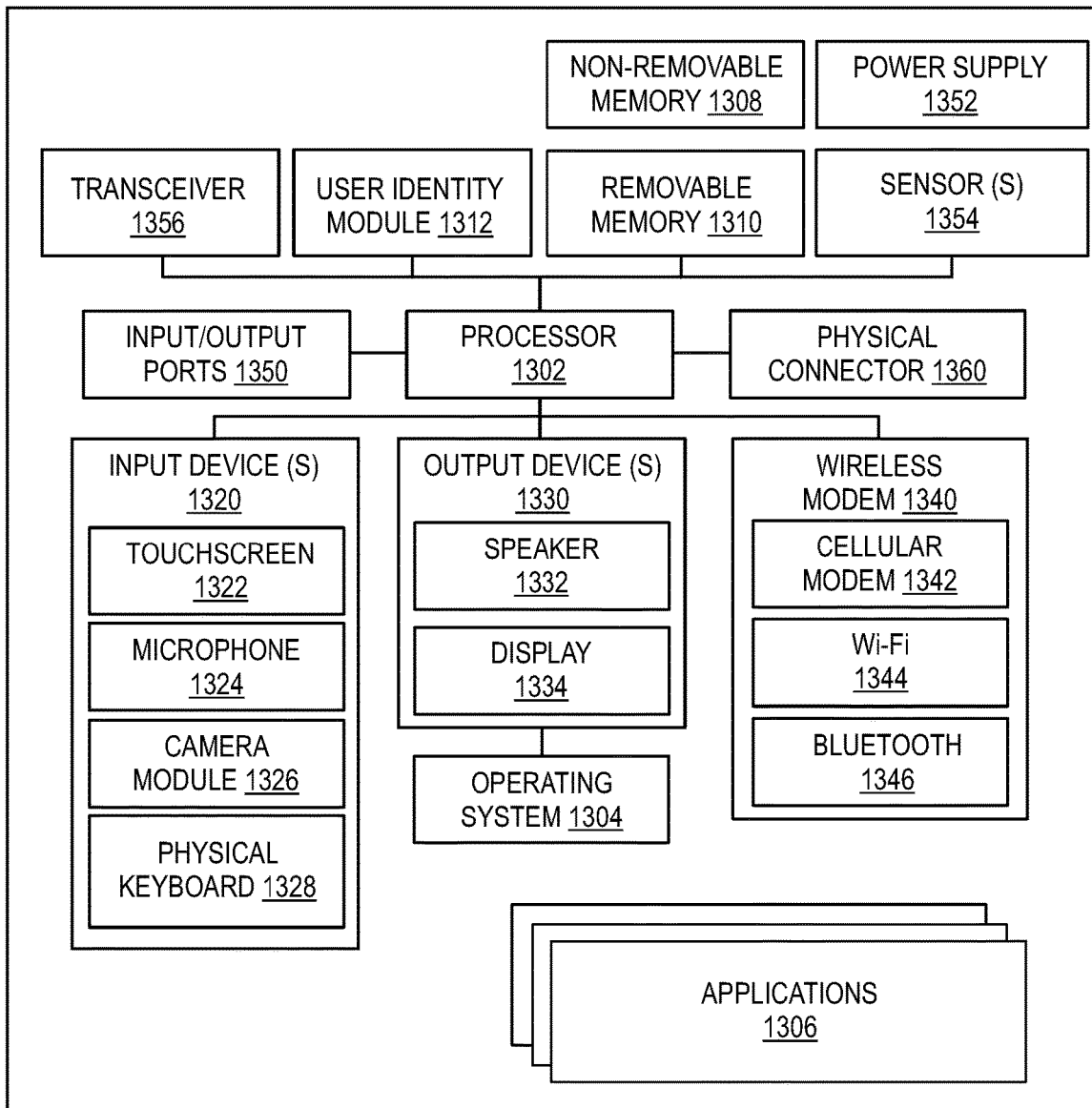
FIG. 13 shows simplified block diagram of a user device capable of implementing the various embodiments of the present disclosure.

FIG. 13 shows simplified block diagram of a user device 1300 capable of implementing the various embodiments of the present disclosure. For example, the user device 1300 may correspond to the electronic device 108 or the electronic device 110 of FIG. 1 or the user device 1040 of FIG. 11. The user device 1300 is depicted to include one or more applications 1306.

It should be understood that the user device 1300 as illustrated and hereinafter described is merely illustrative of one type of device and should not be taken to limit the scope of the embodiments. As such, it should be appreciated that at least some of the components described below in connection with that the user device 1300 may be optional and thus in an example embodiment may include more, less or different components than those described in connection with the example embodiment of the FIG. 13. As such, among other examples, the user device 1300 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1300 includes a controller or a processor 1302 (e.g., a signal processor, microprocessor, ASIC, or other control and processing logic circuitry) for performing such tasks as signal coding, data processing, image processing, input/output processing, power control, and/or other functions. An operating system 1304 controls the allocation and usage of the components of the user device 1300 and support for one or more payment application programs (see, applications 1306), that implements one or more of the innovative features, such as sharing of reward points, as described herein. In addition, the applications 1306 may include common mobile computing applications (e.g., telephony applications, email applications, calendars, contact managers, web browsers, messaging applications) or any other computing application.

The illustrated user device 1300 includes one or more memory components, for example, a non-removable memory 1308 and/or a removable memory 1310. The non-removable memory 1308 and/or the removable memory 1310 may be collectively known as database in an embodiment. The non-removable memory 1308 can include RAM, ROM, flash memory, a hard disk, or other well-known memory storage technologies. The removable memory 1310 can include flash memory, smart cards, or a Subscriber Identity Module (SIM). The one or more memory components can be used for storing data and/or code for running the operating system 1304 and the applications 1306. The user device 1300 may further include a user identity module (UIM) 1312. The UIM 1312 may be a memory device having a processor built in. The UIM 1312 may include, for example, a subscriber identity module (SIM), a universal integrated circuit card (UICC), a universal subscriber identity module (USIM), a removable user identity module (R-UIM), or any other smart card. The UIM 1312 typically stores information elements related to a mobile subscriber. The UIM 1312 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1300 can support one or more input devices 1320 and one or more output devices 1330. Examples of the input devices 1320 may include, but are not limited to, a touch screen/a display screen 1322 (e.g., capable of capturing finger tap inputs, finger gesture inputs, multi-finger tap inputs, multi-finger gesture inputs, or keystroke inputs from a virtual keyboard or keypad), a microphone 1324 (e.g., capable of capturing voice input), a camera module 1326 (e.g., capable of capturing still picture images and/or video images) and a physical keyboard 1328. Examples of the output devices 1630 may include but are not limited to a speaker 1332 and a display 1334. Other possible output devices can include piezoelectric or other haptic output devices. Some devices can serve more than one input/output function. For example, the touch screen 1322 and the display 1334 can be combined into a single input/output device.

A wireless modem 1340 can be coupled to one or more antennas (not shown in the FIG. 13) and can support two-way communications between the processor 1302 and external devices, as is well understood in the art. The wireless modem 1340 is shown generically and can include, for example, a cellular modem 1342 for communicating at long range with the mobile communication network, a Wi-Fi compatible modem 1344 for communicating at short range with an external Bluetooth-equipped device or a local wireless data network or router, and/or a Bluetooth-compatible modem 1346. The wireless modem 1340 is typically configured for communication with one or more cellular networks, such as a GSM network for data and voice communications within a single cellular network, between cellular networks, or between the user device 1300 and a public switched telephone network (PSTN).

The user device 1300 can further include one or more input/output ports 1340, a power supply 1342, one or more sensors 1344 for example, an accelerometer, a gyroscope, a compass, or an infrared proximity sensor for detecting the orientation or motion of the user device 1300 and biometric sensors for scanning biometric identity of an authorized user, a transceiver 1356 (for wirelessly transmitting analog or digital signals) and/or a physical connector 1360, which can be a USB port, IEEE 1294 (FireWire) port, and/or RS-232 port. The illustrated components are not required or all-inclusive, as any of the components shown can be deleted and other components can be added.

The disclosed embodiments with reference to FIGS. 1 to 8, or one or more operations of the flow diagram 900 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server systems 150 its various components such as the computer system 1005 and the database 1010 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
   posting by a social media platform, a message from a first user for redemption of a fixed number of reward points that are nearing expiry, the message including an option for responding to the message, the message containing one or more social identifiers (IDs) of the first user linked to a payment account associated with the first user, wherein nearing expiry includes expiring in one week;
   receiving, by the social media platform, a selection from a second user of the option in the message, the selection indicating an offer for redeeming the fixed number of reward points;
   sending, by the social media platform, a notification to the first user seeking approval of the offer for redeeming the fixed number of reward points;
   receiving, by the social media platform, a selection from the first user of an option in the notification to approve the offer;
   authenticating the first user based on one or more social IDs of the first user received from an issuer,
   wherein, based on a server system identifying a social ID of the second user, the social ID of the second user being linked to a payment account associated with the second user, the server system computes a price of the fixed number of reward points, the price being computed by multiplying a value of one reward point in a first currency with the fixed number of reward points, the first currency being a local currency of country of residence of the first user, debits from the payment account associated with the second user a second amount equivalent to the computed price, in a second currency, the second currency being a local currency of a country of residence of the second user, the second amount being calculated by applying a rate of exchange between the first currency and the second currency to the computed price, credits the computed price into the payment account associated with the first user, and transfers the fixed number of reward points from the first user to the second user based on a mapping file and the social ID of the second user, the mapping file mapping the one or more social IDs of the first user to the payment account of the first user.

2. The method as claimed in claim 1, further comprising: provisioning, by an issuer, an online interface to facilitate linking of the one or more social IDs of the first user to the payment account associated with the first user, wherein an authentication of the first user is performed by the issuer and a respective social media platform for each social ID linked to the payment account associated with the first user.

3. The method as claimed in claim 2, wherein the online interface displays a list of linked social IDs and provides an option to select the one or more social IDs from the list of linked social IDs.

4. The method as claimed in claim 1, wherein the selection of the option by the second user is configured to invoke a notification to the first user, the notification invoked to seek approval of the first user.

5. The method as claimed in claim 1, wherein the fixed number of reward points are transferred from a first reward points account associated with the first user to a second reward points account associated with the second user, the first reward points account and the second reward points account associated with a reward program entity registered with the server system.

6. The method as claimed in claim 1, wherein the one week is reckoned from a date of the message posted on the social media platform.

7. The method as claimed in claim 1, further comprising: determining, by the server system, a prevailing currency exchange rate between the local currency of the country of residence of the first user and the local currency of the country of residence of the second user and applying the prevailing currency exchange rate to determine the second amount.

8. The method as claimed in claim 1, further comprising: notifying the price, by the server system, to the second user, wherein the price is notified to the second user on a contact identifier of the second user associated with the social ID of the second user.

9. The method as claimed in claim 8, wherein the second amount is debited subsequent to a receipt of an approval provided by the second user in response to the price notification.

10. The method as claimed in claim 1, wherein the one or more social IDs of the first user linked to the payment account associated with the first user are activated after a defined time period.

11. A computer system comprising:
    a memory comprising stored instructions; and
    a processor configured to execute the stored instructions to cause the computer system to at least:
       post by a social media platform a message from a first user for redemption of a fixed number of reward points that are nearing expiry, the message including an option for responding to the message, the message containing one or more social identifiers (IDs) of the first user linked to a payment account associated with the first user, wherein nearing expiry includes expiring in one week;
       receive, by the social media platform, a selection from a second user of the option in the message, the selection indicating an offer for redeeming the fixed number of reward points;
       send, by the social media platform, a notification to the first user seeking approval of the offer for redeeming the fixed number of reward points;
       receive, by the social media platform, a selection from the first user of an option in the notification to approve the offer;
       authenticate the first user based on one or more social IDs of the first user received from an issuer,
       wherein, based on a server system identifying a social ID of the second user, the social ID of the second user being linked to a payment account associated with the second user, the server system computes, a price of the fixed number of reward points, the price being computed by multiplying a value of one reward point in a first currency with the fixed number of reward points, the first currency being a local currency of country of residence of the first user, debits from the payment account associated with the second user a second amount equivalent to the computed price, in a second currency, the second currency being a local currency of a country of residence of the second user, the second amount being calculated by applying a rate of exchange between the first currency and the second currency to the computed price, credits the computed price into the payment account associated with the first user, and transfers the fixed number of reward points from the first user to the second user based on a mapping file and the social ID of the second user, the mapping file mapping the one or more social IDs of the first user to the payment account of the first user.

12. The computer system as claimed in claim 11, wherein an issuer is configured to provision an online interface to facilitate linking of the one or more social IDs of the first user to the payment account associated with the first user, wherein an authentication of the first user is performed by the issuer and a respective social media platform for each social ID linked to the payment account associated with the first user.

13. The server system as claimed in claim 12, wherein the online interface displays a list of linked social IDs and provides an option to select the one or more social IDs from the list of linked social IDs.

14. The computer system as claimed in claim 1, wherein the selection of the option by the second user is configured to invoke a notification to the first user, the notification invoked to seek approval of the first user.

15. The computer system as claimed in claim 11, wherein the one week is reckoned from a date of the message posted on the social media platform.

16. The computer system as claimed in claim 11, wherein the server system is further caused to determine a prevailing currency exchange rate between the local currency of the country of residence of the first user and the local currency of the country of residence of the second user and applying the prevailing currency exchange rate to determine the second amount.

17. The computer system as claimed in claim 11, wherein the server system is further caused to:
  notify the price to the second user, wherein the price is notified to the second user on a contact identifier of the second user associated with the social ID of the second user; and
  facilitate a debiting of the second amount from the payment account associated with the second user, the second amount debited subsequent to a receipt of an approval provided by the second user in response to the price notification, wherein the payment account associated with the first user is credited with one of the second amount and a number of reward points equivalent to the second amount.

18. A non-transitory computer-readable medium having stored thereon program instructions for causing at least one processor to perform operations comprising:
  posting by a social media platform, a message from a first user for redemption of a fixed number of reward points that are nearing expiry, the message including an option for responding to the message, the message containing one or more social identifiers (IDs) of the first user linked to a payment account associated with the first user, wherein nearing expiry includes expiring in one week;
  receiving, by the social media platform, a selection from a second user of the option in the message, the selection indicating an offer for redeeming the fixed number of reward points;
  sending, by the social media platform, a notification to the first user seeking approval of the offer for redeeming the fixed number of reward points;
  receiving, by the social media platform, a selection from the first user of an option in the notification to approve the offer;
  authenticating the first user based on one or more social IDs of the first user received from an issuer,
  wherein, based on a server system identifying a social ID of the second user, the social ID of the second user being linked to a payment account associated with the second user, the server system computes a price of the fixed number of reward points, the price being computed by multiplying a value of one reward point in a first currency with the fixed number of reward points, the first currency being a local currency of country of residence of the first user, debits from the payment account of the second user a second amount equivalent to the computed price, in a second currency, the second currency being a local currency of a country of residence of the second user, the second amount being calculated by applying a rate of exchange between the first currency and the second currency to the computed price, credits the computed price into the payment account of the first user and transfers the fixed number of reward points from the first user to the second user subsequent to a debiting of the second amount from the payment account of the second user, the transferring of the fixed number of reward points being based on a mapping file and the social ID of the second user, the mapping file mapping the one or more social IDs of the first user to the payment account of the first user.

19. The non-transitory computer-readable medium as claimed in claim 18, wherein the selection of the option by the second user is configured to invoke a notification to the first user, the notification invoked to seek approval of the first user.

20. The non-transitory computer-readable medium as claimed in claim 18, wherein the one week is reckoned from a date of the message posted on the social media platform by the first user.

\* \* \* \* \*